(12) United States Patent
Gamage et al.

(10) Patent No.: US 10,836,955 B2
(45) Date of Patent: Nov. 17, 2020

(54) DEMOLITION AGENT

(71) Applicant: MONASH UNIVERSITY, Clayton (AU)

(72) Inventors: Ranjith Pathegama Gamage, Clayton (AU); Radhika Shehan Vidanage De Silva, Clayton (AU)

(73) Assignee: Monash University (AU)

( * ) Notice: Subject to any disclaimer, the term of this patent is extended or adjusted under 35 U.S.C. 154(b) by 0 days.

(21) Appl. No.: 16/193,248

(22) Filed: Nov. 16, 2018

(65) Prior Publication Data
US 2019/0153301 A1 May 23, 2019

(30) Foreign Application Priority Data
Nov. 17, 2017 (AU) ................. 2017261600

(51) Int. Cl.
| | |
|---|---|
| C09K 8/66 | (2006.01) |
| C04B 7/00 | (2006.01) |
| C04B 22/00 | (2006.01) |
| E21B 43/263 | (2006.01) |
| C09K 8/74 | (2006.01) |
| C09K 8/68 | (2006.01) |

(52) U.S. Cl.
CPC ............. C09K 8/665 (2013.01); C09K 8/68 (2013.01); C09K 8/74 (2013.01); E21B 43/263 (2013.01)

(58) Field of Classification Search
CPC .............................. C09K 7/02; C04B 41/0009
See application file for complete search history.

(56) References Cited

U.S. PATENT DOCUMENTS

| | | | | |
|---|---|---|---|---|
| 3,008,843 A | * | 11/1961 | Jolly ................. | C04B 24/32 106/285 |
| 4,354,877 A | * | 10/1982 | Kawano ............. | E04G 23/08 106/695 |
| 4,409,030 A | * | 10/1983 | Minegishi .......... | C04B 28/10 106/728 |
| 4,477,284 A | * | 10/1984 | Isogai ............... | B02C 23/06 106/695 |
| 4,565,579 A | * | 1/1986 | Fujioka ............. | C04B 7/00 106/773 |
| 4,600,154 A | | 7/1986 | Hirota et al. | |
| 4,807,530 A | * | 2/1989 | Ishii ................. | C04B 41/0009 102/312 |
| 4,952,243 A | | 8/1990 | Kobayashi et al. | |
| 5,004,506 A | | 4/1991 | Allen et al. | |

(Continued)

OTHER PUBLICATIONS

Mudd, G. M. 2010. The Environmental sustainability of mining in Australia: key mega-trends and looming constraints. Resources Policy, 35, 98-115.

(Continued)

*Primary Examiner* — Angela M DiTrani Leff
*Assistant Examiner* — Avi T Skaist
(74) *Attorney, Agent, or Firm* — Renner Kenner Greive Bobak Taylor & Weber

(57) ABSTRACT

A soundless cracking demolition agent (SCDA) comprising quicklime, water, a viscosity enhancing agent (VEA), a high range water reducing admixture (HRWR) and an anhydrous accelerator component. A method for in-situ leaching and a method for the recovery of unconventional oil or gas utilising the SCDA of the present invention are also described.

4 Claims, 24 Drawing Sheets

(56) References Cited

U.S. PATENT DOCUMENTS

| | | | | |
|---|---|---|---|---|
| 6,221,152 | B1* | 4/2001 | Dial | C04B 40/0035 |
| | | | | 106/162.8 |
| 2010/0310846 | A1* | 12/2010 | Berke | C04B 28/04 |
| | | | | 428/219 |

OTHER PUBLICATIONS

Nakajima, K., Ikehara, T. & Nishi, T. 1996. Observation of gellan gum by scanning tunneling microscopy. Carbohydrate Polymers, 30, 77-81.

Natanzi, A. S., Laefer, D. F. & Connolly, L. 2016. Cold and moderate ambient temperatures effects on expansive pressure development in soundless chemical demolition agents. Construction and Building Materials, 110, 117-127.

Noda, S., Funami, T., Nakauma, M., Asai, I., Takahashi, R., Al-Assaf, S., Ikeda, S., Nishinari, K. & Phillips, G. O. 2008. Molecular structures of gellan gum imaged with atomic force microscopy in relation to the rheological behavior in aqueous systems. 1. Gellan gum with various acyl contents in the presence and absence of potassium. Food Hydrocolloids, 22, 1148-1159.

Norgate, T. & Jahanshahi, S. 2010. Low grade ores—Smelt, leach or concentrate? Minerals Engineering, 23, 65-73.

Ogawa, E., Matsuzawa, H. & Iwahashi, M. 2002. Conformational transition of gellan gum of sodium, lithium, and potassium types in aqueous solutions. Food Hydrocolloids, 16, 1-9.

Peterson, V. K. & Juenger, M. C. G. 2006. Hydration of tricalcium silicate: effects of CaCl2 and sucrose on reaction kinetics and product formation. Chemistry of materials, 18, 5798-5804.

Plank, J., Lummer, N. R. & Dugonjić-Bilić, F. 2010. Competitive adsorption between an AMPS®-based fluid loss polymer and Welan gum biopolymer in oil well cement. Journal of Applied Polymer Science, 116, 2913-2919.

Pointeau, I., Reiller, P., Macé, N., Landesman, C. & Coreau, N. 2006. Measurement and modeling of the surface potential evolution of hydrated cement pastes as a function of degradation. Journal of Colloid and Interface Science, 300, 33-44.

Pollock, T. J. 1993. Gellan-related polysaccharides and the genus Sphingomonas. Microbiology, 139, 1939-1945.

Porter, M. L., Bertó, A., Primus, C. M. & Watanabe, I. 2010. Physical and chemical properties of new-generation endodontic materials. Journal of endodontics, 36, 524-528.

Qiu, X., Zeng, W., Yu, W., Xue, Y., Pang, Y., Li, X. & Li, Y. 2015. Alkyl chain cross-linked sulfobutylated lignosulfonate: a highly efficient dispersant for carbendazim suspension concentrate. ACS Sustainable Chemistry & Engineering, 3, 1551-1557.

Ramachandran, V. S. 1971. Possible states of chloride in the hydration of tricalcium silicate in the presence of calcium chloride. Matériaux et Construction, 4, 3-12.

Riding, K., Silva, D. A. & Scrivener, K. 2010. Early age strength enhancement of blended cement systems by CaCl2 and diethanol-isopropanolamine. Cement and Concrete Research, 40, 935-946.

Sakata, N., Yanai, S., Yokozeki, K. & Maruyama, K. 2003. Study on new viscosity agent for combination use type of self-compacting concrete. Journal of Advanced Concrete Technology, 1, 37-41.

Singh, N. & Ojha, P. 1981. Effect of CaCl2 on the hydration of tricalcium silicate. Journal of Materials Science, 16, 2675-2681.

Soeda, K. & Harada, T. 1993. The Mechanics of Expansive Pressure Generation Using Expansive Demolition Agent. Doboku Gakkai Ronbunshu, 1993, 89-96.

Stein, H. N. 1972. Thermodynamic considerations on the hydration mechanisms of Ca3SiO5 and Ca3Al2O6. Cement and Concrete Research, 2, 167-177.

Stein, H. N. & Stevels, J. M. 1964. Influence of silica on the hydration of 3 CaO,SiO2. Journal of Applied Chemistry, 14, 338-346.

Sueur, L. Chemical and morphological studies of the hydration of tricalcium silicate. Proc. Br. Ceram. Soc., 1984. 177.

Thomas, J. J., Allen, A. J. & Jennings, H. M. 2009. Hydration kinetics and microstructure development of normal and CaCl2-accelerated tricalcium silicate pastes. The Journal of Physical Chemistry C, 113, 19836-19844.

Tregger, N., Ferrara, L. & Shah, S. P. 2008. Identifying viscosity of cement paste from mini-slump-flow test. ACI Materials Journal, 105, 558-566.

Valentini, L. 2013. RieCalc: quantitative phase analysis of hydrating cement pastes. Journal of Applied Crystallography, 46, 1899-1902.

Valentini, L., Dalconi, M. C., Favero, M., Artioli, G. & Ferrari, G. 2015. In-Situ XRD Measurement and Quantitative Analysis of Hydrating Cement: Implications for Sulfate Incorporation in C—S—H. Journal of the American Ceramic Society, 98, 1259-1264.

Viallis-Terrisse, H., Nonat, A. & Petit, J.-C. 2001. Zeta-Potential Study of Calcium Silicate Hydrates Interacting with Alkaline Cations. Journal of Colloid and Interface Science, 244, 58-65.

Wang, X., Chen, L., Xiang, H. & Ye, J. 2007. Influence of anti-washout agents on the rheological properties and injectability of a calcium phosphate cement. Journal of Biomedical Materials Research Part B: Applied Biomaterials, 81, 410-418.

Wanniarachchi, W., Ranjith, P., Perera, M., Lashin, A., Al Arifi, N. & Li, J. 2015. Current opinions on foam-based hydro-fracturing in deep geological reservoirs. Geomechanics and Geophysics for Geo-Energy and Geo-Resources, 1, 121-134.

Wilding, C., Walter, A. & Double, D. 1984. A classification of ignorance and organic admixtures by conduction calorimetry. Cement and Concrete Research, 14, 185-194.

Xu, L., Xu, G., Liu, T., Chen, Y. & Gong, H. 2013. The comparison of rheological properties of aqueous welan gum and xanthan gum solutions. Carbohydrate polymers, 92, 516-522.

Zingg, A., Winnefeld, F., Holzer, L., Pakusch, J., Becker, S. & Gauckler, L. 2008. Adsorption of polyelectrolytes and its influence on the rheology, zeta potential, and microstructure of various cement and hydrate phases. Journal of Colloid and Interface Science, 323, 301-312.

Andrew J. Allen, et al.; Composition and Density of Nanoscale Calcium-Silicate-Hydrate in Cement; Published online: Mar. 25, 2007; doi: 10.1038/nmat1871; nature materials; vol. 6; Apr. 2007; www.nature.com/naturematerials; 2007 Nature Publishing Group; 6 pages.

Shobeir Arshadnejad, et al.; A Model to Determine Hole Spacing in the Rock Fracture Process by Non-Explosive Expansion Material; International Journal of Minerals, Metallurgy and Materials; vol. 18, No. 5, Oct. 2011; p. 509.

Adrien Bouvet, et al.; The Mini-Conical Slump Flow Test; Analysis and Numerical Study; Cement and Concrete Research; 2010 1517-1523; http://ees.elsevier.com/CEMCON/default.asp.

Paul Wencil Brown, et al.; The Effect of Inorganic Salts or Tricalcium Silicate Hydration; Cement and Concrete Research; vol. 16, pp. 17-22; 1985.

Jeffrey W. Bullard; New Insights Into the Effect of Calcium Hydroxide Precipiation on the Kinetics of Tricalcium Silicate Hydration; 1894-1903 (2010).

S. Chatterji, et al; Mechanism of Expansion of Concrete Due to the Presence of Dead-Burnt CaO and MgO; vol. 25, No. 1; pp. 51-56; 1995; 6 pages.

C.R. Cheeseman, et al.; Effect of Calcium Chloride of the Hydration and Leaching of Lead-Retarded Cement; Cement and Concrete Research 29 (1999) 885-892; 8 pages.

Radhika Vidanage De Silva, et al.; An Alternative to Conventional Rock Fragmentation Methods Using SCDA; A Review; 31 pages.

Archer USA; Dexpan Demolition Agent; https://www.dexpan.com/; 5 pages.

Sidney Diamond, et al.; Fate of Calcium Chloride Dissolved in Concrete Mix Water; Communications of the American Ceramic Society; Nov. 1981; 3 pages.

D.D. Double, P.C. Hewlett, K.S.W. Sing and J.F. Raffle; New Developments in Understanding the Chemistry of Cement Hydration [and discussion]; rsta.royalsocietypublishing.org; Oct. 11, 2014; 21 pages.

Adam Sieminski; International Energy Outlook 2016; Center for Strategic and International Studies; 20126-05-11; 35 pages.

(56) References Cited

OTHER PUBLICATIONS

Amr El Dessouki, Hani Mitri; Rock Breakage Using Expansive Cement; Engineering, 2011, 3, 168-173; http://www.scirp.org/journal/eng.

Y. Elakneswaran, et al; Electrokinetic Potential of Hydrated Cement in Relation to Adsorption of Chlorides; Cement and Concrete Research 39 (2009) 340-344; 5 pages.

Arsenion M. Flatho, et al; Occurrence, Production, and Application of Gellan: Current State and Perspectives; https://www.researchgate.net/publication/5345371; 13 pages.

L. M. Formosa, et al.; A Quantitative Method for Determining the Antiwashout Characteristics of Cement-Based Dental Meterials Including Mineral Trioxide Aggregate; doi: 10.1111/j. 1365-2591.2012.02108.x; 8 pages.

Daniel M. Franks, et al.; Sustainable Development Principals for the Disposal of Mining and Mineral Processing Wastes; www.elsevier.com/locate/resourpol; 9 pages.

Saki Noda, et al.; Molecular Structure of Gellan Gum Imaged With Atomic Force Microscopy in Relation to the Rheological Behavior in Aqueous Systems. www.sciencedirect.com; ScienceDirect; 1148-1159; 12 pages.

Ellis M. Gartner; Thermodynamics of Calcium Silicate Hydrates and Their Solutions; Oct. 1987; 7 pages.

Z. Giergiczny; Effect of Some Additives on the Reactions in Fly ASH-Ca(OH)2 System; Journal of Thermal Analysis and Calorimetry, vol. 76 (2004) 747-754; 8 pages.

James Hansen, et al.; Global Temperature Change; PNAS; Jul. 31, 2006; 6 pages.

Mohamed Heikal; Effect of Calcium Formate as an Accelerator on the Physicochemical and Mechanical Properties of Pozzolanic Cement Pastes; www.sciencedirect.com; 1051-1056; 6 pages.

Ashraf Heniegal; Behavior of Underwater Self-Compacting Concrete; Jan. 2012; https://www.researchgate.net/publication/283997524; 20 pages.

Jimmie Hinze, et al.: Properties of Soundless Chemical Demolition Agents; 12 Pages.

M. Ish-Shalom, et al. Properties of Type K Expansive Cement of Pure Components; Cement and Concrete Research., vol. 4, p. 519-532, 1974.

Allen, F.L. Best, G.H. & Lindroth, T.A. 1991. Welan Gum in Cement Compositions. Google Patents.

Gallucci, E., Mathur, P. & Scrivener, K. 2010. Microstructurel development of early age hydration shells around cement grains. Cement and Concrete Research, 40, 4-13.

Harada, T., Soeda, K., Idemitsu, T. & Watanabe, A. Characteristics of expansive pressure of an expansive demolition agent and the development of new pressure transducers. Proceedings—Japan Society of Civil Engineers, 1993. Dotoku Gakkai, 91-91. English Abstract.

Huang, H., Liu, Y. & Liu, R. 2009. [*Sphingomonas* sp.: an important microbial resource for biopolymer synthesis]. Wei sheng wu xue bao= Acta microbiologica Sinica, 49, 560-566. English Abstract.

Ishii, S., Kubota, H., Hida, T. & Migita, J. 1989. Expansive demolition agent. Google Patents.

Ish-Shalom, M. & Bentur, A. 1975. Properties of type K expansive cement of pure components III. Hydration of pure expansive component under varying restraining conditions. Cement and Concrete Research, 5, 139-152.

Juenger, M., Monteiro, P., Gartner, E. & Denbeaux, G. 2005. A soft X-ray microscope investigation into the effects of calcium chloride on tricalcium silicate hydration. Cement and Concrete Research, 35, 19-25.

Kai, D., Li, D., Zhu, X., Zhang, L., Fan, H. & Zhang, X. 2009. Addition of sodium hyaluronate and the effect on performance of the injectable calcium phosphate cement. Journal of Materials Science: Materials in Medicine, 20, 1595-1602.

Kang, K. S. & Veeder, G. T. 1982. Heteropolysaccharide S-130. Google Patents.

Kantro, D. L. 1975. Tricalcium silicate hydration in the presence of various salts. Journal of Testing and Evaluation, 3, 312-321.

Kantro, D. L. 1980. Influence of water-reducing admixtures on properties of cement paste—a miniature slump test. Cement, Concrete and aggregates, 2, 95-102.

Kaur, V., Bera, M. B., Panesar, P. S., Kumar, H. & Kennedy, J. 2014. Welan gum: microbial production, characterization, and applications. International journal of biological macromolecules, 65, 454-461.

Kawano, T. & Ishii, S. 1982. Demolition agent for brittle materials. Google Patents.

Khayat, K. & Saric-Coric, M. Evaluation of the effect of Welan Gum-superplasticizer interaction on characteristics and of cement grouts. Proceedings, 6th CANMET/ACI international conference on superplasticizers and other chemical admixtures in concrete, ACI SP, 2000. 249-268.

Khayat, K. & Yahia, A. 1997. Effect of welan gum-high-range water reducer combinations on rheology of cement grout. ACI Materials Journal, 94, 365-372

Khayat, K. H. 1995. Effects of antiwashout admixtures on fresh concrete properties. Materials Journal, 92, 164-171.

Khayat, K. H. 1998. Viscosity-enhancing admixtures for cement-based materials—an overview. Cement and Concrete Composites, 20, 171-188.

Kobayashi, W., Otaka, S. & Nagai, M. 1990. Statical demolition-facilitating agent. Google Patents.

Kuzel, H. J. & Pöllmann, H. 1991. Hydration of C3A in the presence of Ca(OH)2, CaSO4•2H2O and CaCO3. Cement and Concrete Research, 21, 885-895.

Kwan, A. & Wong, H. 2008. Effects of packing density, excess water and solid surface area on flowability of cement paste. Advances in Cement Research.

Laefer, D. F., Ceribasi, S., Wortman, J., Abrozevitch-Cooper, N., Huynh, M.-P. & Midgette, J. 2010. Expansive fracture agent behaviour for concrete cracking.

Lavrentovich, O. D., Lazo, I. & Pishnyak, O. P. 2010. Nonlinear electrophoresis of dielectric and metal spheres in a nematic liquid crystal. Nature, 467, 947-950.

Ma, L., Zhao, Q., Yao, C. & Zhou, M. 2012. Impact of welan gum on tricalcium aluminate—gypsum hydration. Materials Characterization, 64, 88-95.

Mailvaganam, N. P. & Rixom, M. 2002. Chemical admixtures for concrete, CRC Press.

Makino, Y., Kakinuma, T., Iwata, T., Itoh, M. & Hirose, T. 1988. Demolition agent for brittle materials. Google Patents.

* cited by examiner

Hydration rate of Alite (Bullard and Flatt, 2010)

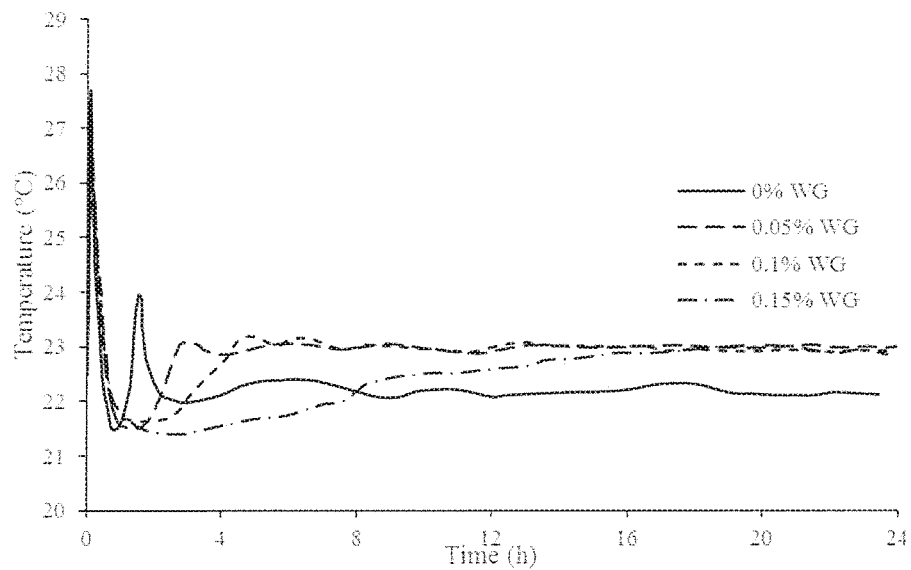
Figure 12
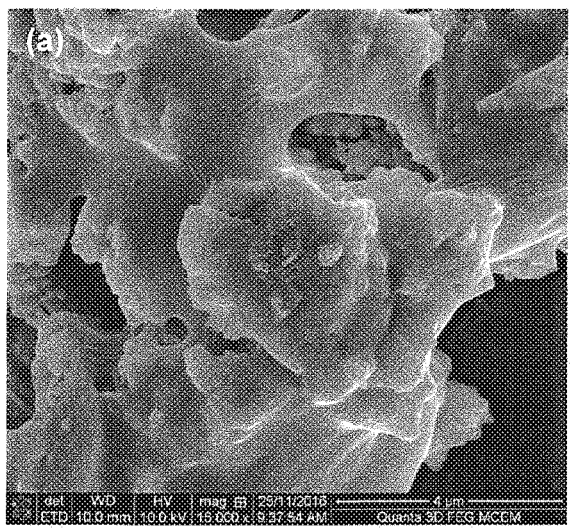
SCDA + 0.1 % WG at 30% WC
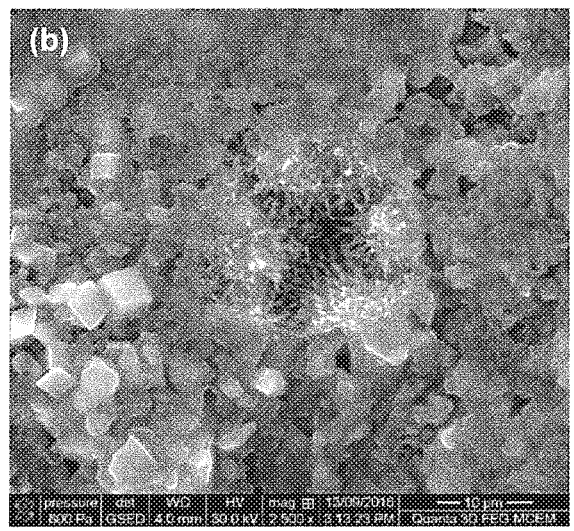
SCDA at 30% WC (De Silva et al., 2017)
Figure 13a and 13b

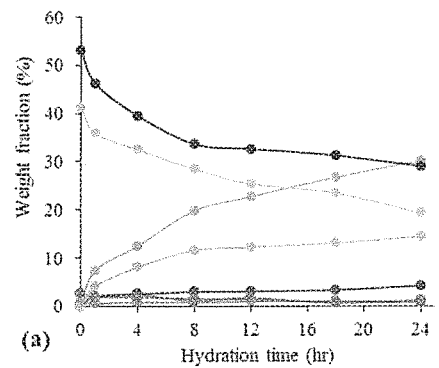 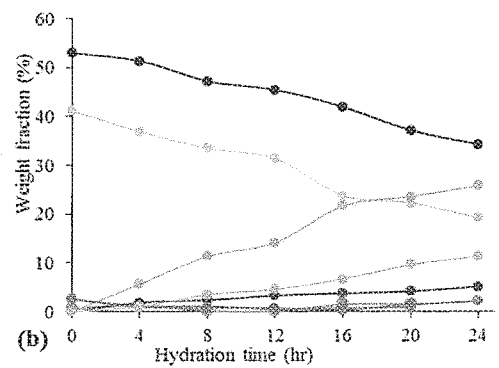
Figures 27a and 27b
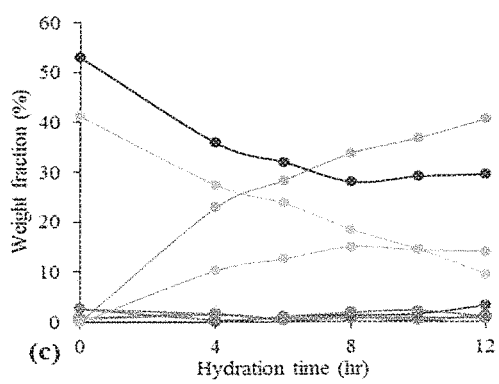 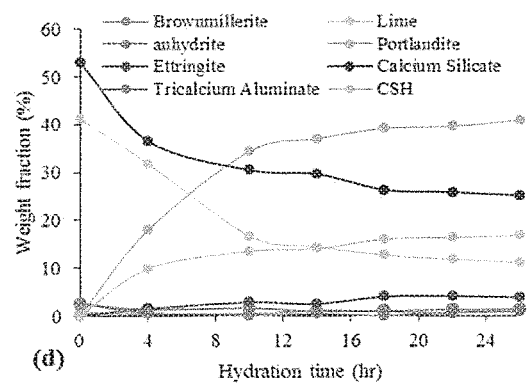
Figures 27c and 27d

| Saturation fluid | Confining pressure | Number of primary fractures | Fracture Pattern |
|---|---|---|---|
| Water | 70 kPa | 4 |  |
| | 1 MPa | 3 |  |
| | 5 MPa | 3 |  |
| | 10 MPa | 3 |  |
| | 15 MPa | 3 |  |
| | 20 MPa | 4 |  |

| | | | |
|---|---|---|---|
| 20% NaCl brine | 5 MPa | 3 |  |
| | 10 MPa | 5 |  |
| | 15 MPa | 5 |  |
| | 20 MPa | 5 |  |
| Oil | 15 MPa | 2 |  |
| | 20 MPa | 3 |  |

DEMOLITION AGENT

FIELD OF THE INVENTION

The present invention relates to an improved demolition agent. More particularly, the demolition agent of the present invention is a soundless cracking demolition agent.

The improved demolition agent is intended to provide improved performance when used underwater, in saturated rock environments, and under high confining pressures.

BACKGROUND ART

Climate change is one of the greatest challenges to have emerged in recent history and is generally accepted to demand immediate mitigation measures to minimise any irreversible global impacts. Amongst the various mitigation options, the use of sustainable energy resources such as solar and wind have seen a considerable growth in recent years and are expected to rise further. There has been a consequent rise in interest in, inter alia, lithium and lithium extraction and recovery options. However, continuing to use current methods of rock fragmentation in mineral recovery leads to numerous adverse environmental impacts such as high stresses on freshwater resources and generation of waste rock (Mudd, 2010). Therefore, to reduce the inevitable environmental impact caused by current mining practices, it is essential to investigate more environmentally sustainable techniques such as in-situ leaching (ISL) of minerals (Norgate and Jahanshahi, 2010; Franks et al., 2011). Such considerations have made the use of soundless cracking demolition agents (SCDAs) a topic of great research interest. According to the recent studies (De Silva et al., 2016), it is found that SCDA can be used to fracture the rock mass during mineral and energy extractions and finally, enhance the efficiency of ISL processes by increasing the leaching contact area.

Soundless cracking demolition agents (SCDAs) are cementitious and powdery substances that are high in calcium oxide content. SCDAs undergo a volume expansion when mixed with water, which can be utilised in rock fracturing for mining applications. SCDAs produce a complex network of localised fractures which are preferable for mineral extraction than the single large fractures generated using traditional fracking methods. Although having the potential to produce a dense network of fractures when injected to a borehole, the applicability of SCDAs in underwater mining has been considered limited due to their susceptibility to dilution and mass washout, as well as delayed onset of expansive pressure.

It is understood that SCDAs are a potential alternative to the conventional rock fragmentation methods typically used in deep earth mineral and energy recovery industries. When injected to a borehole drilled in mineral bearing rock, SCDA produces multiple radial fractures propagating from the borehole. This is the result of an induced-expansive pressure during SCDA hydration (De Silva et al. (2016)). The application of SCDAs, however, in underground conditions has been limited due to its susceptibility to dilution, washout mass loss and delayed onset of expansive pressure generation.

Therefore, it will be advantageous to overcome the issues of dilution, washout mass loss and delayed onset of expansive pressure in modified SCDA caused by VEA.

The present invention has as one object thereof to overcome substantially the abovementioned problems associated with the prior art, or to at least provide a useful alternative thereto.

The preceding discussion of the background art is intended to facilitate an understanding of the present invention only. It should be appreciated that the discussion is not an acknowledgement or admission that any of the material referred to formed part of common general knowledge as at the priority date of the application.

Throughout the specification, unless the context requires otherwise, the word "comprise" or variations such as "comprises" or "comprising", will be understood to imply the inclusion of a stated integer or group of integers but not the exclusion of any other integer or group of integers.

References to HRWR admixture(s) and to simply HRWR throughout the specification are each to be understood to refer to a composition that has the properties of a high range water reducing admixture.

Throughout the specification, unless the context requires otherwise, the term 'admixture' or 'admixtures' will be understood to refer to either a single component or a combination of components with or having the associated stated characteristics.

DISCLOSURE OF THE INVENTION

In accordance with the present invention there is provided a soundless cracking demolition agent comprising quicklime, water, a viscosity enhancing agent (VEA), a high range water reducing admixture (HRWR) and an anhydrous accelerator component.

Preferably, the viscosity enhancing agent is:
a. a biodegradable polymer;
b. an anionic, high molecular weight exopolysaccharide; or
c. welan gum.

The HRWR is preferably provided in the form of a sodium salt of naphthalene formaldehyde sulfonic acid.

Preferably, the anhydrous accelerator component is provided in the form of $CaCl_2$.

In a preferred form of the present invention there is provided a soundless cracking demolition agent (SCDA) comprising quicklime and about 30% water, about 0.1% welan gum, about 2.5% HRWR and about 2% $CaCl_2$ by weight of SCDA.

In accordance with the present invention there is further provided a method for the in-situ leaching of minerals, the method comprising the utilisation of a soundless cracking demolition agent as described above to enhance the leaching efficiency of mineral ore using expansive pressure to produce a localised complex fracture network underwater or within a saturated ore-bearing rock environment.

In accordance with the present invention there is still further provided a method for unconventional oil or gas recovery, the method comprising the utilisation of a soundless cracking demolition agent as described above to provide access to oil or gas using expansive pressure to produce a localised complex fracture network underwater or within a saturated rock environment.

BRIEF DESCRIPTION OF THE DRAWINGS

The will now be described, by way of example only, with reference to one embodiment thereof and the accompanying drawings, in which:

FIG. 12 is a graph of time dependent temperature profiles observed in SCDA with increasing welan gum content;

FIGS. 13a to 13j show the morphology of SCDA at 6 hr, 12 hr, 16 hr, 20 hr, 24 hr of hydration, being (a), (c), (e), (g), (i) with 0.1% welan gum (left), and (b), (d), (f), (h), (j) unmodified SCDA (right);

FIGS. 27a to 27d shows the solid phase composition of SCDA during hydration (a) unmodified SCDA, (b) SCDA+ 0.1% VEA, (c) SCDA+2% $CaCl_2$, and (d) SCDA+0.1% VEA+2% $CaCl_2$;

BEST MODE(S) FOR CARRYING OUT THE INVENTION

Figure 1:
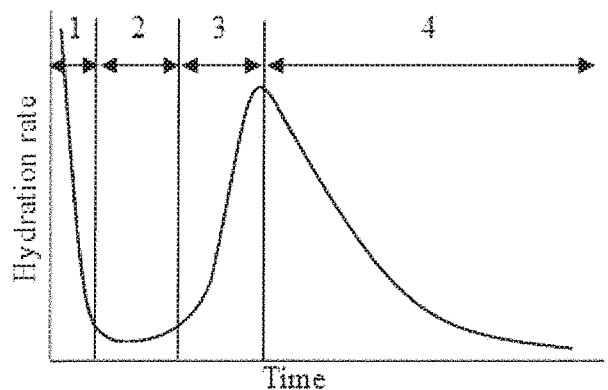
FIG. 1 is a graph of the hydration rate of alite (Bullard and Flatt, 2010)

The present invention provides a soundless cracking demolition agent comprising quicklime (CaO), water, a viscosity enhancing admixture (VEA), a high range water reducing admixture (HRWR) and an anhydrous accelerator component. The viscosity enhancing agent may be provided in the form of a biodegradable polymer, for example an anionic, high molecular weight exopolysaccharide. In one preferred form the VEA is welan gum.

The HRWR is provided, in one form of the invention, as a sodium salt of naphthalene formaldehyde sulfonic acid. The anhydrous accelerator component is, for example, provided in the form of $CaCl_2$.

In a preferred form of the present invention there is provided a soundless cracking demolition agent (SCDA) comprising quicklime and about 30% water, about 0.1% welan gum, about 2.5% HRWR and about 2% $CaCl_2$ by weight of SCDA.

The present invention further provides a method for the in-situ leaching of minerals, the method comprising the utilisation of a soundless cracking demolition agent as described above to enhance the leaching efficiency of mineral ore using expansive pressure to produce a localised complex fracture network underwater or within a saturated ore-bearing rock environment.

The present invention still further provides a method for unconventional oil or gas recovery, the method comprising the utilisation of a soundless cracking demolition agent as described above to provide access to oil or gas using expansive pressure to produce a localised complex fracture network underwater or within a saturated rock environment.

Modifiers to Enhance the Washout Resistance of SCDA

SCDAs behave in a way similar to cement paste during its hydration process (Hinze and Brown, 1994). When injected into a borehole saturated with water, SCDAs lose their cohesion and dissolve in the water due to dilution. Use of SCDAs for underground applications has therefore been limited to dry rock masses. The current practice for underwater usage of SCDA involves separation of SCDA from water by using plastic tubing (Dexpan, 2016), which, however, limits the usage of SCDAs in mining industry applications. The dilution and washout effect in cement systems can however be reduced by viscosity enhancing admixtures (VEAs). VEAs can be divided into several classes depending on their constituents (Mailvaganam and Rixom, 2002) as follows:

Class A—Water-soluble synthetic and natural organic polymers that include cellulose ethers, polyethylene oxides, polyacrylamide, and polyvinyl alcohol;

Class B—Water-soluble organic flocculants that increase viscosity by enhancing the interparticle attraction. These include styrene polymers with carboxyl groups, synthetic polyelectrolytes, and natural gums;

Class C—Organic emulsions such as acrylic emulsions and aqueous clay dispersions, which enhance interparticle attraction of cement molecules;

Class D—Water-swellable inorganic materials with high surface area, which increases water retention capacity of cement paste, such as bentonites, silica fume, and milled asbestos; and Class E—Inorganic materials with high surface area, which increase the content of fines in the paste and as a result increase fluidity with increasing shear stresses. These materials include fly ash, hydrated lime, kaolin and fine rock dust.

The majority of these polymer classes consist of toxic materials, which can cause detrimental environmental repercussions if injected into a saturated rock mass. Among the options, water-soluble polysaccharides consist of long-chained biopolymers and have minimal environmental impacts. They adhere to water molecules in the cement mixture and intertwine with adjacent molecules, converting them to a gel-like substance and eventually increase the viscosity of the cement paste (Khayat and Yahia, 1997, Khayat, 1998). Welan gum, a type of biodegradable polymer, has a minimal impact on the environment and therefore was considered in this study as a suitable viscosifier to address the SCDA wash out effect.

Welan gum is an anionic, high molecular weight, exopolysaccharide which is a Class A VEA produced by a controlled submerged fermentation using Alcaligenes ATCC 31555 microorganism species (Kaur et al., 2014, Plank et al., 2010). The agent acts as a thickener, suspender, binder, emulsifier and a viscosifier, and is currently being used in oil well drilling applications to improve well cement properties (Kang and Veeder, 1982; Khayat and Saric-Coric, 2000). This long-chained biopolymer has a linear tetrasaccharide backbone structure consisting of glucose, glucuronic acid, rhamnose and mannose (Fialho et al., 2008, Pollock, 1993, Huang et al., 2009). It had shown compatibility with Calcium and high temperatures and high salinity (Xu et al., 2013), which makes it an ideal candidate to be used with SCDA in deep mining applications. The carbohydrate backbone of the biopolymer means that welan gum will not have the adverse environmental impacts, which otherwise would increase if VEAs such as milled asbestos and acrylic emulsions were substituted. Interestingly, combining low concentrations of welan gum in cement systems has been found to reduce fluid loss (Allen et al., 1991). When mixed with a superplasticizer, welan gum can be used as an admixture in cement systems, which has anti-washout resistance without much increase in viscosity (Khayat and Saric-Coric, 2000; Khayat and Yahia, 1997; Sakata et al., 2003; Allen et al., 1991). Importantly, the use of welan gum in conjunction with SCDAs and its influence on SCDA behaviour has not yet been studied.

SCDA Washout Loss Reduction Capability of Welan Gum

Welan gum has the ability to enhance the washout resistance of a hydrating cement system through the processes of adsorption, association, and intertwinement. It is understood that the viscosity of SCDA paste increases when welan gum molecules bind to the periphery of water molecules and eventually adsorb them to the available long chained polymer. Adjacent polymer molecules attract each other by restricting the free motion of water, and the viscosity of a cement paste can be further increased by the entanglement of polymer strands in high concentrations (Khayat, 1995). This combination of mechanisms enhances the resistance of a cement paste for washout mass loss by improving the water retention capacity of the cement system. However, this may cause flowability reduction and delay the setting time of the mortar while increasing the hydration time due to the adsorption process (Khayat and Yahia, 1997). This shows that before using welan gum as a VEA for SCDA, measures must be taken to mitigate its unfavourable impacts; flowability reduction and delaying the setting time.

The fluidity of a paste containing welan gum can be increased by using a high range water reducing (HRWR) admixture (Kaur et al., 2014). Previous studies have shown that use of a naphthalene based HRWR with welan gum has the capability to increase the fluidity of a cement paste while significantly increasing its initial setting time by nearly 100% (Khayat, 1995, Khayat, 1998).

Further, the acyl and glyceryl components present in welan gum increase the link between polymer chains and promote inter-helical association forming double helices (Noda et al., 2008, Ogawa et al., 2002). The strong helical bonding arrangement of welan gum molecules allows greater flexibility of molecular bundles in welan gum making welan gum insensitive to temperature changes (Xu et al., 2013). These formed bundles of welan gum molecules further interact with other adjacent molecules through Van Der Waals forces that occur in-between the methyl group of the rhamnosyl residue and the backbone and side chains of molecules. The inter-helical links of adjacent, parallel welan gum molecules restrict the molecules movement in the solution, which enhances the solution viscosity. An in-depth explanation of this viscosity increasing phenomenon occurring in welan gum has been given in the zipper model proposed by Nakajima et al. (1996).

However, there remains a lack of understanding regarding the effect of welan gum on improving the washout resistance and the development of expansive pressure in SCDA. The inventors have undertaken to bridge this gap through efforts to gain a precise understanding of welan gum reaction with SCDA in term of its effects on expansive pressure development and mechanical, microstructural and mineralogical morphology of the SCDA modified with welan gum. It is understood that significant conclusions may be drawn from a comprehensive comparison of properties of the modified SCDA system with those of an unmodified SCDA system as described in the literature.

Modifiers for enhanced SCDA expansion rate.

The expansion caused in SCDA, mainly by the hydration of CaO (Soeda and Harada, 1993; Arshadnejad et al., 2011; Natanzi et al., 2016) is controlled by the addition of cementing compounds such as calcium silicates and calcium aluminates. Attempting to increase the expansive pressure generation rate by increasing the proportion of CaO (lime) with different proportions of other cementing materials, such as $3CaO.Al_2O_3$ (Tri-calcium aluminate) and $3CaO.SiO_2$ (Calcium silicate/Alite) leads to the generation of excessive heat and the resulting steam eventually causes the hydrating SCDA to blowout from the borehole (Kawano and Ishii, 1982; Hirota and Ishizaki, 1986; Makino et al., 1988; Harada et al., 1993; Hinze and Brown, 1994; Natanzi et al., 2016). One option to overcome this blowout issue previously noted is blending cementing materials with lime to limit the excessive hydration rate of CaO crystals (Kawano and Ishii, 1982, Kobayashi et al., 1990).

Various methods have been developed in the past to enhance the rate of expansive pressure generation in SCDA. Ishii et al., (1989), and Hirota and Ishizaki, (1986) introduced a technique of pressure molded SCDA pellets. In this technique, when charged in a borehole, and hydrated with water, the voids within the pellets allow the superheated steam to escape from the borehole and prevents blowout. However, this method increases the processing cost of SCDAs and pellets tend to break and return to a powder form during transportation. In another study an attempt was made to reduce the demolition time of SCDA whilst preventing blowout, by replacing 50% of the free lime with solid particles such as sand and zeolite grains (Kobayashi et al., 1990) which are inert to water. This allows the SCDA to be dry packed into the borehole and then fed with water to allow hydration. The void structure resulting from the addition of the inert solid component allows the release of pressure developed by the steam. The rapid hydration reaction of CaO was controlled by increasing the particle size of SCDA, which may however lead to incomplete hydration of SCDA. Further, adding solid parts such as sand to SCDA means that this additional mass will be left in the borehole making it difficult to perform post-fracture operations in an ISL.

A number of additives have been used in the cement industry as accelerators, each of which have different effects on cementitious materials. These include a number of chemical compounds such as alkali hydroxides, silicates, fluorosilicates, organic compounds, $Ca(NO_3)_2$, $NaNO_3$, $KNO_3$, $CaS_2O_3$, $CaSO_4$, $Na_2CO_3$, $K_2CO_3$, $AlCl_3$, $NaCl$, $KCl$, and $CaCl_2$, usually added by 0.2-5% by weight of cement (Ishii et al., 1989, Giergiczny, 2004, Heikal, 2004, Juenger et al., 2005).

Among these chemical compounds, $CaSO_4$ has been widely used by a number of researchers to find its effectiveness as a chemical accelerator in the cement hydration process (Brown et al., 1986, Giergiczny, 2004, El Dessouki and Mitri, 2011). Generally, the addition of $CaSO_4$ to the system allows for the greater formation of $3CaO.Al_2O_3.CaSO_4.32H_2O$ (ettringite) crystals. However, the prospect of using $CaSO_4$ as an accelerator is limited by the amount of excess $3CaO.Al_2O_3$ present in the system for the formation of ettringite crystals as $3CaO.Al_2O_3$ (calcium aluminate) is a key component in ettringite formation. In calcium silicate cements, the addition of $CaSO_4$ has been found to increase the dissolution of alite in early stages of hydration followed by a delayed dissolution of cementing particles, which retards hydration over time (Brown et al., 1986). Based on the composition of SCDA (refer Table 1 below), hydration reactions given by Eq. [1], Eq. [2] and Eq. [3] below can be expected to occur in a hydrating SCDA system (Kuzel and Pöllmann, 1991; Allen et al., 2007).

TABLE 1

Composition of SCDA

| Component | Percentage/Wt % |
|---|---|
| CaO | 81.95 |
| Al2O3 | 1.22 |
| Fe2O3 | 0.23 |
| MgO | 0.12 |
| SiO2 | 13.91 |
| CaSO4 | 2.57 |

These reactions create hydration products of $Ca(OH)_2$ (portlandite), calcium silicate hydrate (CSH) (Eq. [2]) and ettringite (Eq. [3]). The limited calcium aluminate content in SCDA (according to Table 1) makes Eq. [1] and Eq. [2] the dominant reactions and the formation of ettringite (Eq. [3]) is comparatively less. Since $CaSO_4$ accelerates hydration in calcium aluminate systems, it is not expected that use of $CaSO_4$ to accelerate the hydration of SCDA systems would be successful.

$$CaO + H_2O \rightarrow Ca(OH)_2 \quad [1]$$

$$3CaO.SiO_2 + 3.9H_2O \rightarrow 1.7CaO.SiO_2.2.6H_2O + 1.3Ca(OH)_2 \quad [2]$$

$$3CaO.Al_2O_3 + 3CaSO_4.2H_2O + 26H_2O \rightarrow 3CaO.Al_2O_3.3CaSO_4.32H_2O \quad [3]$$

The effectiveness of other chemical accelerators in cement hydration processes has been investigated by several researchers (Kantro, 1975; Double et al., 1983; Wilding et al., 1984) where the anions and cations in the chemicals used were ranked according to their effectiveness as follows:

$$Ca^{2+} > Sr^{2+} > Ba^{2+} > Li^+ > K^+ > Na^+ \approx Cs^+ > Rb^{30}$$

$$Br^- \approx Cl^- > SCN^- > I^- > NO_3^- > ClO_4^-$$

Considering the effectiveness of the anions and cations in inorganic salts as accelerators in cementitious systems, it is clear that $CaCl_2$ is an extremely effective compound which can act as an accelerator to SCDA system. The effectiveness of $CaCl_2$ as an accelerator in portland cement and the mechanism which triggers the accelerated hydration has previously been documented (Brown et al., 1986; Giergiczny, 2004; Juenger et al., 2005; Peterson and Juenger, 2006; Thomas et al., 2009). According to these studies, $CaCl_2$ can accelerate the hydration by increasing the reaction rate of alite in cement systems. The chemical composition from XRD analysis indicates a high content of alite in SCDA. The inventors have considered $CaCl_2$ as an accelerator for SCDA as described herein.

Controlling the Expansive Pressure Development Rate in SCDA

The hydration of CaO in an SCDA is controlled by the initial rapid reaction of alite in the SCDA. FIG. 1 illustrates the variation of idealised hydration rate of alite overtime for cement (Bullard and Flatt, 2010). As seen in FIG. 1, stage 1 refers to the nucleation of calcium silicate hydrate (CSH) which forms a gel layer around hydrating SCDA cement particles within the first few minutes after hydration. The formed hydration product CSH (Eq. [2]) then inhibits the access of water into unhydrated inner layers of cement particles while reducing the diffusion of $Ca^{2+}$ ions required for the precipitation of $Ca(OH)_2$ (Stein and Stevels, 1964, Stein, 1972, Gartner and Jennings, 1987). As a result, a reduced reaction rate is observed in stage 2 (Bullard and Flatt, 2010; Gallucci et al., 2010). This is followed by a gradual increase in the reaction rate as the water in the cement solution progressively reacts with unhydrated cement particles as seen in stage 3.

A similar phenomenon may be expected in SCDA, where the initial hydration of alite results in the nucleation of CSH which envelops free lime particles in the system, delaying the violent exothermic reaction (Eq. [1]). This phenomenon can be proved from the results of mineralogical analysis. The inventors have confirmed the variation of the phase composition of SCDA during the hydration process, where initially a rapid decrease in the alite phase was observed followed by a lesser rate of reduction in both CaO and alite contents. Thus, increasing the hydration rate of alite is hypothesised by the inventors to result in an early, yet controlled hydration of CaO.

The inventors have undertaken a study in which a potential chemical admixture was introduced in order to accelerate the hydration process in a modified SCDA and its performance in an underwater mining environment was fully characterised by performing comprehensive mechanical, microstructural and mineralogical analyses. The performance of an improved SCDA in accordance with the present invention, under the combined influence of the selected accelerator and VEA, is compared with properties of unmodified SCDA.

The improved soundless cracking demolition agent of the present invention may be described conveniently by way of reference to the following non-limiting examples.

Example 1

The soundless cracking demolition agent, Bristar 100 (produced by Taiheiyo Cement Corporation) was used to assess the ability of welan gum to enhance the washout resistance of expansive cement. The typical composition of the SCDA used in this study is given in Table 2 below. Welan gum WG-PD100 with 7.0-9.0 pH, 500-700 kg/m3 bulk density and a specific gravity of 1.45 was used as the VEA. The sodium salt of naphthalene formaldehyde sulfonic acid was used as the HRWR. In all tests conducted, a 30% water content was maintained.

TABLE 2

Chemical compostion of SCDA (Harada et al., 1993, Laefer et al., 2010, Natanzi et al., 2016)

| Component | Percentage by mass |
|---|---|
| $SiO_2$ | 1.5-8.5 |
| $Al_2O_3$ | 0.3-5.0 |
| $Fe_2O_3$ | 0.2-3.0 |
| CaO | 81-96 |
| MgO | 0-1.6 |
| $SO_3$ | 0.6-4.0 |
| LOI | 0.5-1.2 |

Determination of Washout Resistance of SCDA

Washout resistance of SCDA was considered the most important parameter as it enables SCDA to be used in rock fragmentation under the required circumstances in deep underground applications, particularly when it is inundated by liquids as fresh water, brine or oil. A number of methods are currently in practice to measure the washout resistance of hydrating cement systems. These include measuring the change of mass in the cement system upon injecting cement into a water-filled container (measure the weight of cement remaining after few minutes of shaking (Wang et al., 2007)) and immersing cement into water and measuring the weight of non-decayed mass by means of freeze drying (Kai et al., 2009). Some visual observation methods exist, including spraying water to the cement paste at a known flow rate from a specific distance and determining the mass loss using photographic techniques (Porter et al., 2010). Among various other methods for testing washout resistance, the CRD-C 661-06 specification (Issued 1 Mar. 2006) is an ideal method that gives a quantitative result with good repeatability.

Although CRD-C 661-06 is a widely used method to quantify the washout loss of freshly mixed concrete, this method cannot be directly applied to measure the washout resistance of SCDAs. In brief, this method involves placing the concrete in a perforated container and sinking it in a column of water and raising back at a constant rate. This test cycle is then repeated several times, and mass reduction is measured at every cycle. The washout loss is finally expressed as a percentage of the initial mass of the specimen (Formosa et al., 2013). Because concrete has large aggregate sizes, this test is performed for a concrete mass of 2 kg and perforated container with 5 mm aperture (Heniegal, 2012). Therefore, these specifications are unsuitable for measuring washout resistance of SCDAs due to the finer particle size of SCDAs.

Modification of drop method to measure washout resistance.

Figure 2:
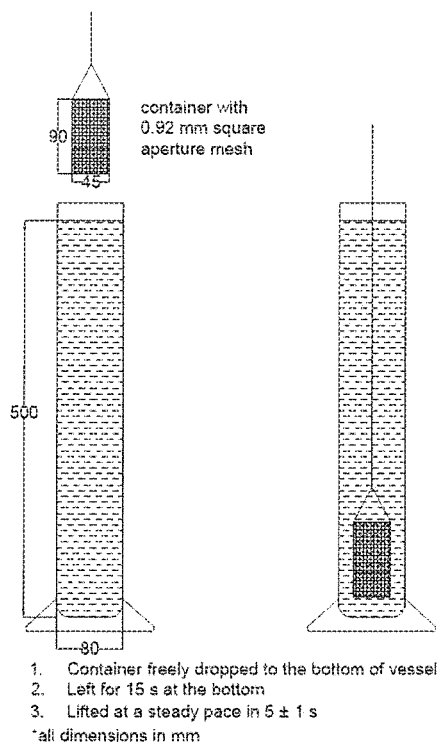
FIG. 2 is a schematic representation of a washout resistance test.

Based on the methodology of CRD-C 661-06, a modified test procedure was adopted in this study to measure the washout loss of SCDA accurately. The developed setup consists of two major components, i.e., a steel container and a water column as shown in FIG. 2. The container had a square base of 45 mm×45 mm and a height of 90 mm and was made of 304 Grade-stainless steel woven wire mesh with 0.35 mm wire thickness and 0.92 mm square aperture. The seams of the container had a 1 mm overlap and were bonded together with an epoxy adhesive (Araldite). A water column with 500 mm height and 80 mm diameter was used to drop the container in.

The specimens were prepared by combining about 50 g of SCDA with 30% of water (by weight of SCDA) to various quantities welan gum and HRWR. The SCDA was mixed for 5 minutes using a mechanical mixer and then was immediately placed into the perforated container. After placing, the surface of the SCDA sample was flattened, and any extruded SCDA was cleaned from the outer surface of the container. The mass of the container with the SCDA specimen was measured and used to calculate the initial mass of the SCDA paste, prior to dropping. Afterwards, the container was allowed to freely fall into the water column and left in the bottom of the column for 15 seconds. The container was then lifted out from the water column at a constant rate, within 5±1 seconds and was allowed to drain on a wire mesh for 2 mins followed by patting the surface of the container to get rid of any surface moisture. The weight of the container was measured, and the test was repeated for 4 cycles. The washout loss of each sample was finally calculated using Eq. [2]:

$$D = \frac{M_i - M_f}{M_i} \times 100 \qquad [2]$$

where D is the total washout loss, $M_i$, is the initial mass of the sample and $M_f$ is the cumulative mass loss in 4 cycles.

Although welan gum is effective in reducing the washout loss of SCDA in submerged conditions, it significantly increases the viscosity of the mixing water, and therefore, another test series was conducted to measure the flowability of SCDA with welan gum. This step allowed to characterise the effect of welan gum on flowability reduction in SCDA.

Flowability Tests for SCDA

Flowability of any cement paste can be measured using a mini-slump flow tests (Tregger et al., 2008; Bouvet et al., 2010; Kantro, 1980; Kwan and Wong, 2008). A miniature slump flow test proposed by Kantro (1980) to characterise the flow in neat cement paste was adopted in this study to measure the flowability of SCDA. Corresponding to the slump flow test given in ASTM C359, a miniature slump cone with dimensions of 19 mm top diameter, 38 mm bottom diameter and a 57 mm height was used in these experiments.

Figure 3:
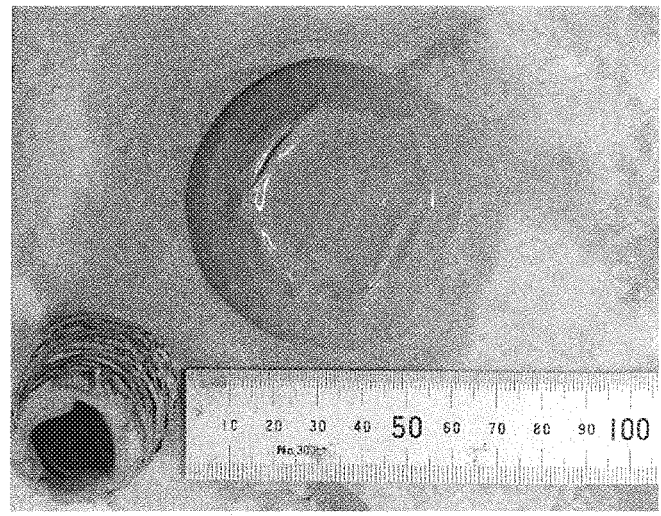
FIG. 3 is a photographic representation of the spread observed in a mini-slump test of SCDA.

HRWR doses of 0%, 0.5%, 1%, 1.5% and 2% by weight of welan gum were added to mixing water and combined with 80 g of welan gum to conduct the test. The flowability of each SCDA mixture containing welan gum (0.05%, 0.1% and 0.15% by weight of SCDA) was tested for different HRWR contents, as described above. This rigorous series of tests allowed the identification of the optimal combination of HRWR and VEA, which yielded maximum flowability with minimum washout loss. Each sample was mixed for a period of 5 minutes and was poured into the mini-slump cone resting on a flat, smooth steel plate. The placing of the SCDA slurry was completed within 1 minute after mixing. The top surface of the cone was leveled off, and the cone was lifted allowing the SCDA paste to flow on the steel surface freely. After allowing the slurry to flow for a period of 1 minute, four diameter measurements (D1-D4) of the spread were taken using a caliper to obtain an average spread diameter. FIG. 3 shows the typical spread of SCDA observed from the mini-slump flow test.

The combined effect of HRWR and welan gum effectively increases the fluidity of a cement based system while reducing its susceptibility to washout loss, however, it also results in the reduction of reaction rate and increases the setting time of cement (Khayat and Saric-Coric, 2000; Khayat and Yahia, 1997; Khayat, 1998). The combined effect of VEA and HRWR on SCDA and its expansive pressure development has not been studied and therefore is still unknown. The expansive pressure development under different VEA contents was then evaluated in the next section in an effort by the inventors to understand the behaviour of SCDA thoroughly.

Expansive Pressure Measurement of SCDA

The expansive pressure development of SCDA in the presence of welan gum was measured by combining ARAMIS 3D digital image correlation technique with the outer pipe method (Harada et al., 1993), where the expansive pressure of SCDA was measured by observing the strain developed on the surface of a steel cylinder containing hydrating SCDA. Here, SCDA was prepared by adding 30% water content and various percentages of welan gum (0.05%, 0.1%, and 0.15% by weight of SCDA). The results obtained from the flowability tests were used to adjust the percentage of HRWR added into the mixing water in each case to obtain a similar flow ability in the SCDA slurry.

Mechanical, Microstructural and Mineralogical Tests

Based on the results of washout resistance, flowability and expansive pressure measurement tests conducted on the modified SCDA, the optimum combination of welan gum and HRWR was selected to generate the maximum expansive pressure while maintaining good flowability and high washout resistance. A series of tests were then conducted on hydrating SCDA with the selected combination of additives to investigate the mechanical, microstructural and mineralogical alterations occurring during the hydration process. Uniaxial compressive strength (UCS) tests incorporating ARAMIS technology, scanning electron microscopy (SEM) and X-ray diffraction (XRD) analysis were carried out to investigate the influence of welan gum on the morphology and the hydration process of SCDA. The detailed methodology adopted for each test is described hereinafter.

In addition, zeta potential analysis on diluted SCDA specimens were carried out to observe the interaction of VEA and SCDA particles, which was required to understand the SCDA washout resistance increasing mechanism in welan gum. The zeta potential of diluted SCDA with 0.1% and 0.15% welan gum was measured using a NanoBrook Omni, zeta potential analyser. This utilises phase analysis light scattering (PALS) to determine the electrophoretic mobility of charged SCDA colloidal suspensions. To conduct zeta potential analysis, SCDA mixed with 30% water content was thoroughly mixed using a mechanical stirrer and the supernatant was diluted with deionized water. Here, the mobility of the colloidal SCDA particles were measured using the phase difference of a reference frequency, where the frequency of the particles moving in an electrical field given by Eq. [3]:

$$V_s = \mu_e E \quad [3]$$

where Vs is the drift velocity of the particle in an electric field E. The apparatus then calculates the zeta potential of a suspension by the use of Smoluchowski limit equation given by:

$$\mu_e = e \frac{\zeta}{\eta} \quad [4]$$

where e is the product of dielectric constant and the permittivity of free space, $\eta$ is the viscosity of the suspension, and $\zeta$ the zeta potential of the colloids (Lavrentovich et al., 2010).

Temperature Measurements of Hydrating SCDA

The heat generated in SCDA through the CaO hydration process (Eq. [1]) results in elevated temperatures. This implies that the temperature profile of an SCDA system gives an additional information on the effect of welan gum on SCDA hydration. A thermocouple was therefore embedded during the hydration of SCDA specimens (with different welan gum contents) to record the temperature throughout the hydration process.

Results and Discussion—VEA and HRWR

The washout resistance and the flowability of SCDA made with varying percentages of welan gum and HRWR are first evaluated and compared. This is followed by checking the expansive pressure development alteration occurring in SCDA with increasing welan gum percentage. The mechanical, microstructural and mineralogical morphology of the modified SCDA were evaluated using a series of compressive strength tests, and a comprehensive microstructural and mineralogical analysis (SEM and XRD) were also performed and the results were compared with the available results of unmodified SCDA, as described in the literature.

Influence of Welan Gum on Washout Resistance and Flowability of SCDA

Table 3 below summarises the alteration of washout mass loss and the flowability of SCDA with various proportions of welan gum and HRWR. A control specimen was also prepared without additives to assess the performance of modified SCDA compared to the unmodified SCDA.

TABLE 3

Washout loss and flow of SCDA mixed with welan gum and HRWR

| VEA (%) | HRWR % | ID | Initial wt, (g) | Drop 1 (g) | Drop 2 (g) | Drop 3 (g) | Drop 4 (g) | Cumulative mass loss (g) | Washout loss (%) | Flow (mm) |
|---|---|---|---|---|---|---|---|---|---|---|
| 0% WG* | 0 | R1 | 74.21 | 67.21 | 56.63 | 52.28 | 45.45 | 21.93 | 35.67 | 68.12 |
| 0.05% WG | 0 | S1 | 71.68 | 71.22 | 71.00 | 70.88 | 69.57 | 2.11 | 3.61 | 44.36 |
| | 0.5 | S2 | 66.46 | 65.30 | 64.23 | 63.51 | 62.24 | 4.22 | 7.92 | 52.64 |
| | 1 | S3 | 69.9 | 66.38 | 58.20 | 46.94 | 45.85 | 24.05 | 42.41 | 61.95 |
| | 1.5 | S4 | 98.57 | 90.48 | 76.77 | 63.74 | 50.62 | 47.95 | 56.16 | 73.01 |
| 0.1% WG | 0 | S5 | 76.77 | 76.64 | 75.22 | 74.83 | 74.68 | 2.09 | 3.30 | 40.23 |
| | 0.5 | S6 | 72.79 | 72.53 | 72.04 | 71.75 | 69.44 | 3.35 | 5.62 | 50.98 |
| | 1 | S7 | 75.29 | 74.93 | 69.45 | 66.85 | 60.77 | 14.52 | 23.43 | 60.27 |
| | 1.5 | S8 | 81.49 | 80.63 | 75.49 | 64.00 | 54.41 | 27.08 | 39.64 | 64.82 |
| 0.15% WG | 0 | S9 | 76.39 | 76.22 | 75.71 | 75.60 | 75.51 | 0.88 | 1.40 | 40.31 |
| | 0.5 | S10 | 74.91 | 74.86 | 74.72 | 74.10 | 73.50 | 1.41 | 2.30 | 47.11 |
| | 1 | S11 | 75.27 | 75.08 | 74.61 | 73.69 | 72.73 | 2.54 | 4.10 | 51.79 |
| | 1.5 | S12 | 75.04 | 75.27 | 73.89 | 72.94 | 71.26 | 3.78 | 6.14 | 54.66 |

*WG—welan gum

Figure 4:
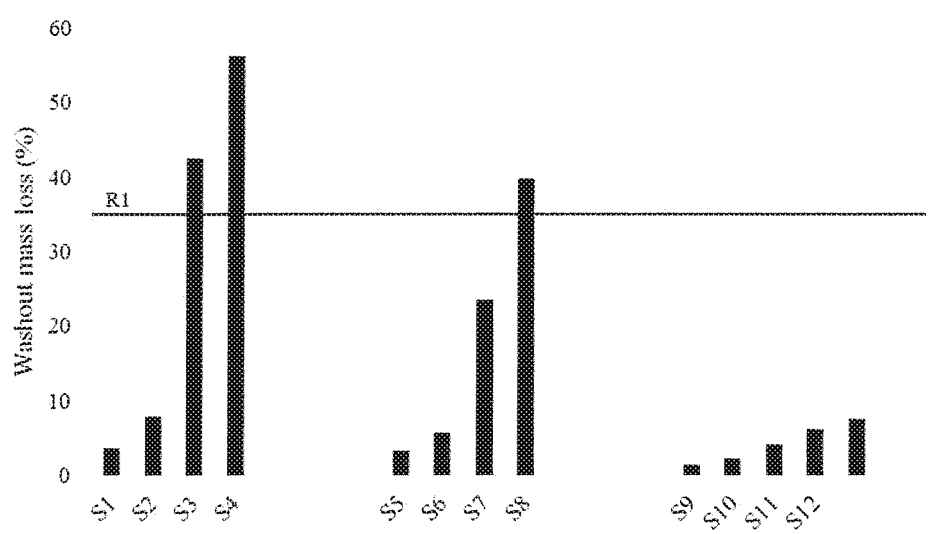
FIG. 4 is a graph of the washout mass loss of SCDA with different welan gum and HRWR dosages.

The washout mass loss recorded for different combinations of welan gum and HRWR is illustrated in FIG. 4. As expected, the addition of welan gum has significantly reduced the washout resistance of the SCDA system. Compared to the control sample R1 (having a washout loss of over 35%), the sample prepared by adding only 0.05% of welan gum by weight of SCDA significantly reduced the washout resistance below 4%. However, according to FIG. 4, increasing of HRWR content to improve the fluidity of the slurry has degraded the washout resistance in SCDA. Although, at a higher welan gum content of 0.15%, no significant change in the washout loss was observed (<10%) with increasing HRWR content, while the fluidity of the cement mix seemed to be substantially reduced.

Figure 5:
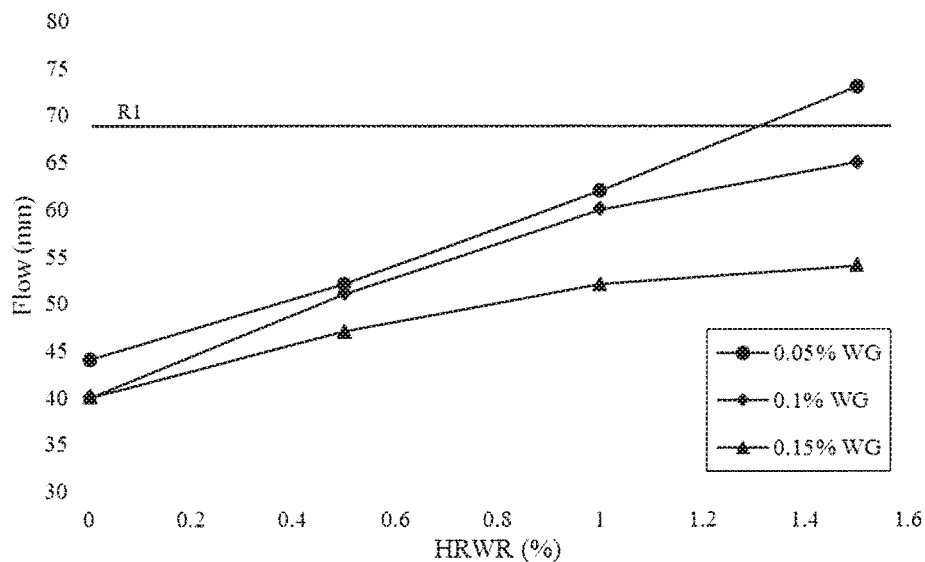
FIG. 5 is a graph of flowability variation with HRWR content.
Figure 6:
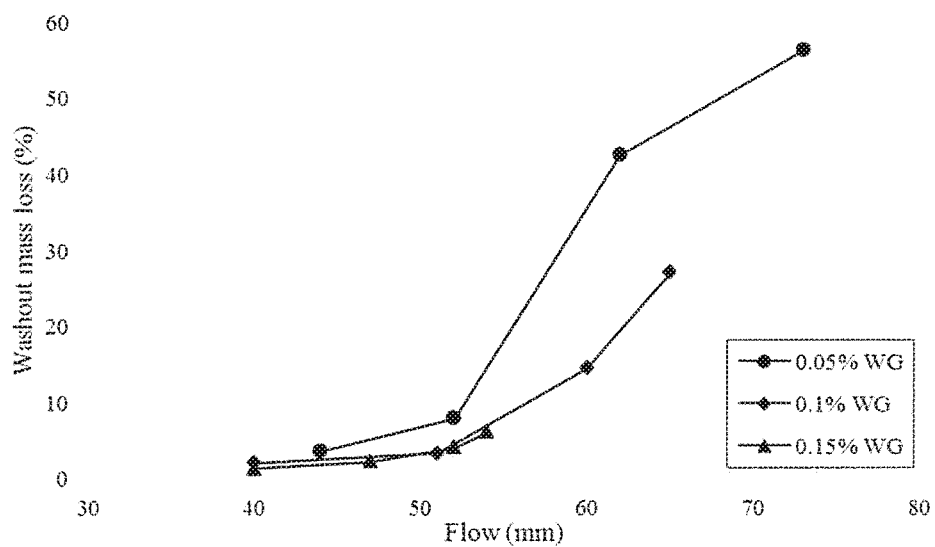
FIG. 6 is a graph of the variation of washout mass loss with increasing flow.

The alteration of flowability of SCDA having different welan gum contents with increasing HRWR dosage is illustrated in FIG. 5. According to FIG. 5, irrespective of the welan gum content, the fluidity of SCDA increases with increasing HRWR content. However, for SCDA containing 0.05% welan gum, increasing of HRWR dosage to 1.5% has caused the flowability to enhance by around 66% (from 44 mm to 73 mm), while only a 35% improvement was observed for SCDA with 0.15% welan gum. To better understand the relationship between washout mass loss and fluidity of SCDA, the washout mass loss with respect to flowability of SCDA was replotted as shown in FIG. 6. As can be seen, washout mass loss increases with the increase of HRWR dosage. In addition, both washout loss and the fluidity remain relatively low at a higher welan gum content (0.15%), where the situation is quite different in the presence of lower welan gum content as 0.05% (a washout mass loss can be seen with increasing HRWR dosage) as shown in FIG. 6.

Importantly, such observations can effectively be used to identify the required optimum of welan gum and HRWR combination to produce SCDA system with maximum functionality (which is less susceptible to washout mass loss while retaining fluidity). This is important in the field as the reduced washout mass loss of SCDA in a water-saturated aquifer can significantly decrease the associated environmental issues by reducing turbidity and avoiding the increase of pH caused by the alkalinity (Khayat and Yahia, 1997).

The Influences of Welan Gum on Expansive Pressure Generation of SCDA

Figure 7:
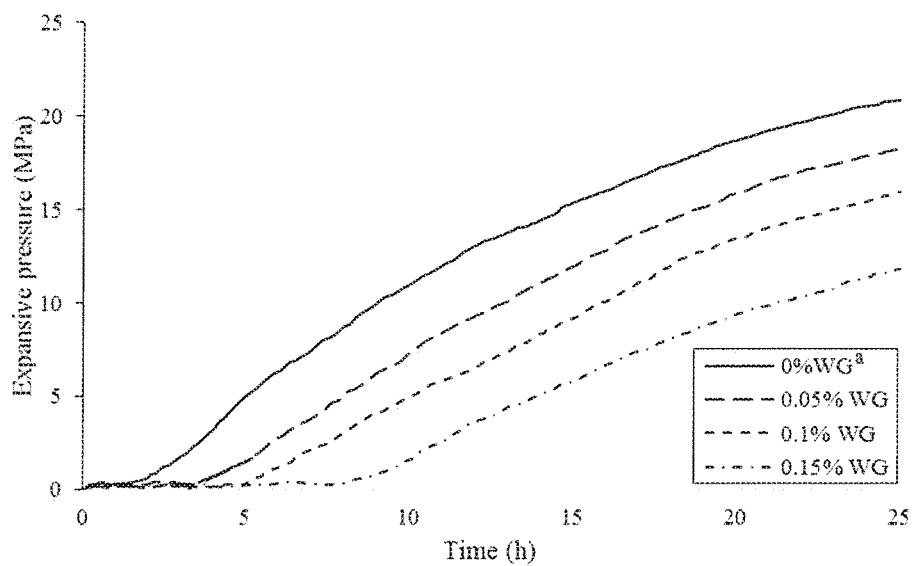
FIG. 7 is a graph of the variation of expansive pressure with welan gum content.

After evaluating the influence of welan gum and HRWR on flowability and washout mass loss of SCDA, a series of experiments were conducted to investigate the effect of welan gum and HRWR on the expansive pressure development. In order to understand this, the development of expansive pressure within a period of 24 hrs in modified SCDA by adding 0.05%, 0.1% and 0.15% of welan gum were considered. The HRWR content in each case of SCDA was also altered to get similar flowability as per the results in Table 3. The expansive pressure development of SCDA mixed with 30% water content having different mix proportions of welan gum and HRWR is illustrated in FIG. 7 and the results are compared with those of an unmodified SCDA sample.

According to FIG. 7 and Table 4 below, a significant delay in the onset of expansive pressure can be observed with increasing welan gum content from 0.05% to 0.15%. Interestingly, the addition of 0.05% of welan gum to SCDA caused a drastic delay in the onset of expansive pressure (from 2 hrs to 3.6 hrs) and the peak expansive pressure developed at the end of 24 hrs has also been significantly reduced (by 9.57%). Twofold (0.1%) and threefold (0.15%) increases in the welan gum concentration in SCDA further reduced the 24 hr expansive pressure by 20.84% and 40.84% respectively compared to the unmodified SCDA.

TABLE 4

Change in expansive pressure development at different welan gum contents.

| WG content (%) | Onset of expansive pressure, t (hr) | $\Delta t$, compared to 0% WG (%) | Rate of initial expansive pressure development, r (MPa/hr) | $\Delta r$, compared to 0% WG (%) | Expansive pressure, p at 24 hr (MPa) | $\Delta p$, compared to 0% WG. |
|---|---|---|---|---|---|---|
| 0 | 2.0 | — | 1.50 | — | 20.15 | — |
| 0.05 | 3.6 | 80 | 1.00 | −33.00 | 18.22 | −9.57 |

TABLE 4-continued

Change in expansive pressure development at different welan gum contents.

| WG content (%) | Onset of expansive pressure, t (hr) | Δt, compared to 0% WG (%) | Rate of initial expansive pressure development, r (MPa/hr) | Δr, compared to 0% WG (%) | Expansive pressure, p at 24 hr (MPa) | Δp, compared to 0% WG. |
|---|---|---|---|---|---|---|
| 0.10 | 5.0 | 150 | 0.88 | −41.33 | 15.95 | −20.84 |
| 0.15 | 8.0 | 400 | 0.67 | −55.33 | 11.92 | −40.84 |

According to the results of expansive pressure development, washout mass loss and flowability, SCDA with 0.1% welan gum develops an expansive pressure of 15.95 MPa (Table 3) at 24 hrs of hydration while maintaining a washout mass loss under 25% and a flowability around 60.27 mm. Although the SCDA with 0.05% welan gum develops a higher expansive pressure of 18.22 MPa compared to the SCDA with 0.1%, it results in a greater washout mass loss of over 41% at similar flowability and the opposite of this is true for SCDA mixed with 0.15% welan gum. Thus, SCDA combined with 0.1% welan gum having a balanced trade-off between washout resistance and expansive pressure development was selected for further testing.

After selecting the optimum combination, the mechanical, microstructural and mineralogical characteristics of the selected composition were investigated by performing a comprehensive strength tests, SEM and XRD analyses to explicitly explain the influence of welan gum on the expansive pressure generation in SCDA.

Mechanical Properties of SCDA in the Presence of Welan Gum

Figure 8:
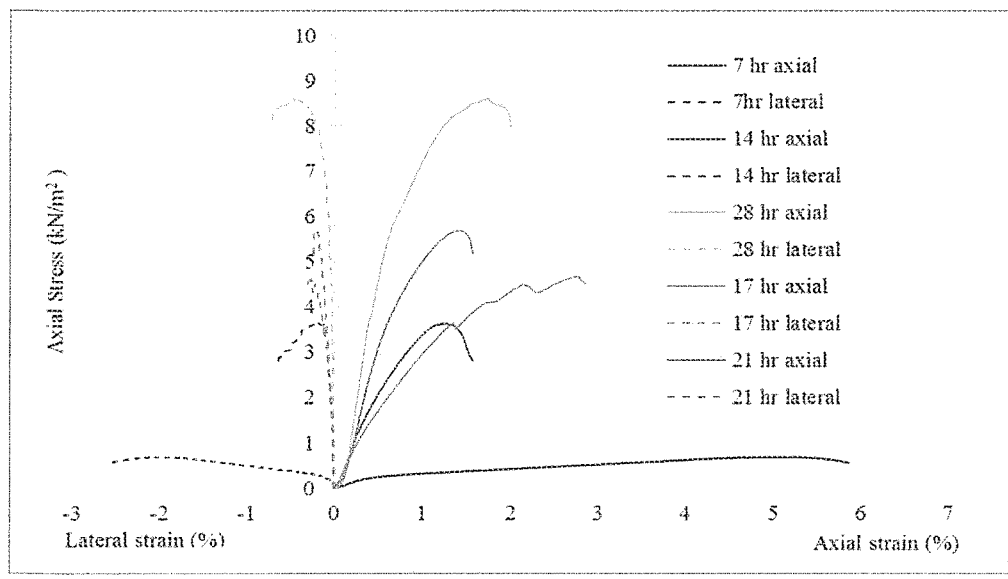
FIG. 8 is a graph of time-dependent stress-strain behaviour of modified SCDA.

According to the existing studies, expansive pressure development of SCDA starts with the initiation of hardening process of SCDA due to alite hydration ($3CaO.SiO_2$), which will eventually enhance the compressive strength and the elastic modulus of SCDA. FIG. 8 shows the stress-strain curves obtained for modified SCDA upon 7 hrs, 14 hrs, 17 hrs, 21 hrs and 28 hrs of hydration, where the time dependent nature of the stress-strain behaviour of SCDA can clearly be observed. In a previous study, it was observed that SCDA samples could only be tested after 4 hrs of initial hardening. However, the water retention capacity of welan gum appears to alter the mechanical properties of SCDA, where the tested samples even after 7 hrs of hydration exhibited a very low compressive strength with large lateral and axial deformations at failure (refer FIG. 8). Consequently, the onset of expansive pressure development of SCDA with 0.1% of welan is also delayed compared to unmodified SCDA.

Figure 9:
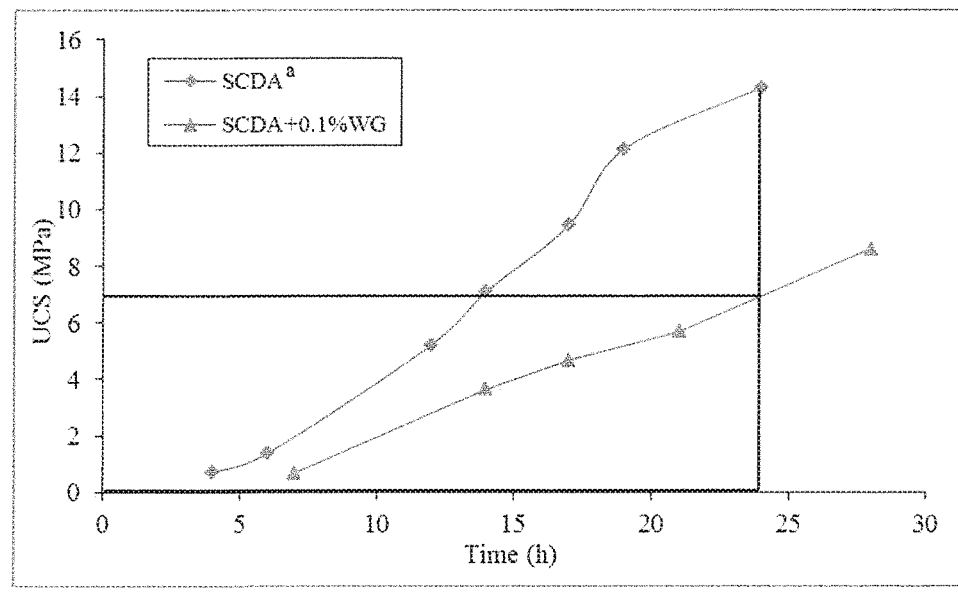
FIG. 9 is a graph of peak strength variation of SCDA with time.

FIG. 9 shows the variation of peak strength of SCDA having enhanced washout resistance compared with unmodified SCDA. The UCS of unmodified SCDA increases from 0.7 MPa to 14.31 MPa with increasing the hydration time from 4 hrs to 24 hrs, whereas adding 0.1% welan gum has caused a strength gain delay, leading to a UCS of only 8.61 MPa after 28 hrs of hydration. Overall, around 52% of a strength reduction at 24 hrs of hydration was observed for the modified SCDA due to the delayed hydration effect.

Figure 10A:
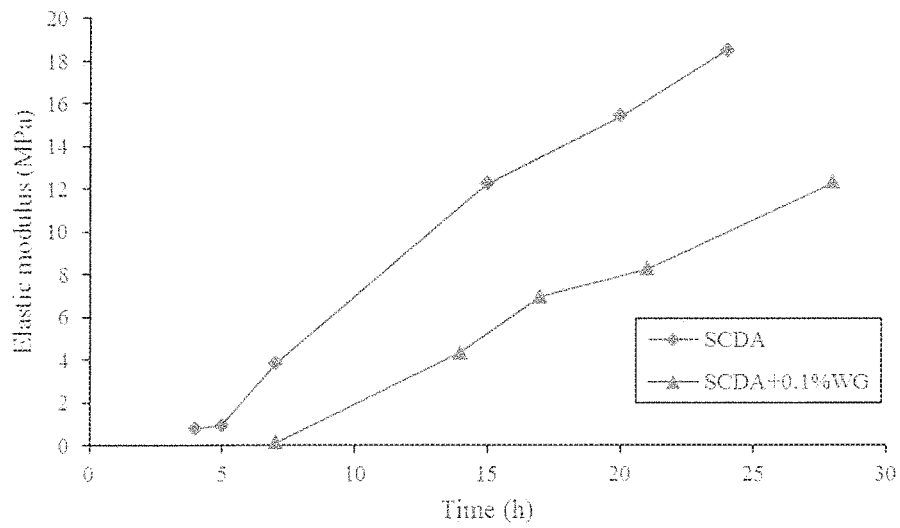
FIG. 10a is a graph of the time-dependent mechanical properties of SCDA—Elastic modulus.

Similar trends could be found in the calculated elastic moduli and Poisson's ratios of the modified SCDA. As shown in FIG. 10a, the elastic modulus of the modified SCDA remains well below the recorded values for unmodified SCDA. In addition, although the onset of expansive pressure occurs 5 hrs after hydration, a very low elastic modulus of 0.1 MPa could be observed for the modified SCDA after 7 hrs of hydration. Soeda and Harada (1993) showed that, in order to develop expansive pressure, SCDA must have a rigid structure created by the hydration of alite. This expansive pressure development mechanism has been well explained using a spherical expansion model by De Silva et al. (2016). The lower elastic moduli observed in this study for modified SCDA compared to unmodified SCDA (refer FIG. 10a) could be, the inventors believe, a reason for the reduced expansive pressure development observed in the modified SCDA.

Figure 10B:
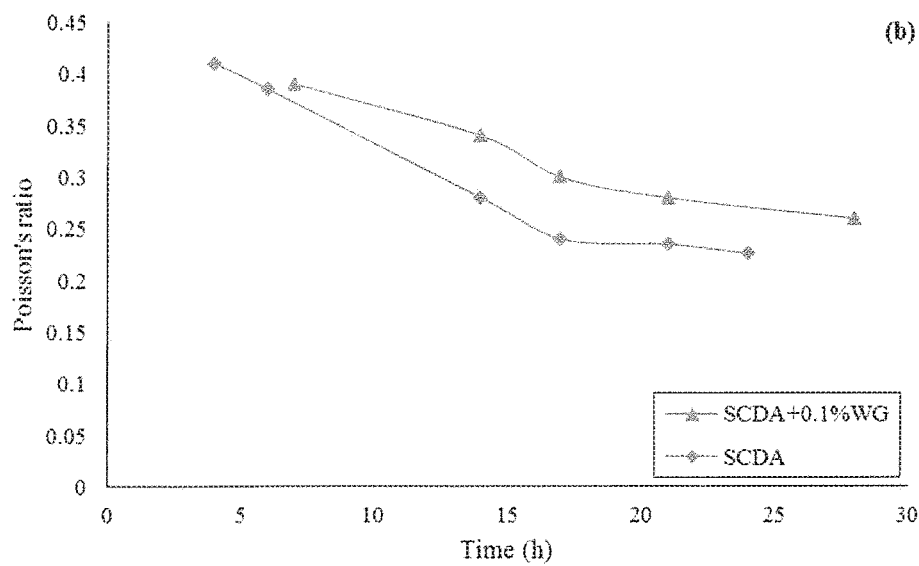
FIG. 10b is a graph of the time-dependent mechanical properties of SCDA—Poisson's ratio.

This is further evident by the trend of Poisson's ratio. As shown in FIG. 10b, compared to the unmodified SCDA, the modified SCDA shows around 21% higher average Poisson's ratio indicating a larger deformability in SCDA and this also affects the observed reduced expansive pressure generation. This behaviour of SCDA is resultant from delayed hydration caused by the binding of water molecules to welan gum and the adsorption of welan gum to cement particles, both of which allow the SCDA to remain plastic for prolonged durations.

Figure 11:
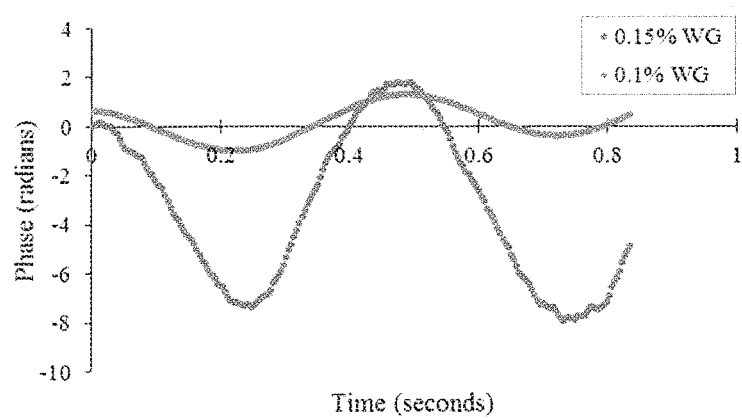
FIG. 11 is a graph of observed phase fluctuation with time.

A zeta potential analysis was conducted for SCDA containing 0.1% and 0.15% of welan gum to further investigate the mechanisms involved in expansive pressure generation and mechanical behaviour of hydrating SCDA. The zeta potential of the diluted pore fluid obtained from the hydrating cement paste was measured using PALS technique (Qiu et al., 2015). The observed phase angle variation over time for the two suspensions are shown in FIG. 11. The smooth sine curves obtained in the experiment indicates a stable suspension of colloids in the pore fluid of SCDA. The stability observed in the colloidal suspension indicates that no flocculation of the colloids is taking place and hence no precipitation of $Ca(OH)_2$ in the pore fluid of SCDA is occurring which is essential for the hydration of the SCDA system. Given in Table 5 below are the computed average mobility and zeta potential results of the samples by averaging 100 cycles.

TABLE 5

Computed mobility and zeta potential of pore fluid of SCDA with welan gum.

| Sample | Mobility (μ/s)/(V/cm) | | Zeta potential (mv) | |
|---|---|---|---|---|
| | mean | std. dev | mean | std. dev |
| 0% WG | .22 | .59 | 2.786 | 7.60 |
| 0.10% WG | −0.98 | 0.24 | −12.56 | 3.1 |
| 0.15% WG | −2.15 | 0.1 | −27.54 | 1.24 |

If the hydration process of SCDA is considered, the dissolution of alite and lime in the pore fluid of hydrating SCDA initially saturates the solution with $Ca^{2+}$ ions (Chatterji, 1995). The initial hydration of alite increases the strength of SCDA and forms calcium silicate hydrate (CSH) gel having a negative surface charge (Pointeau et al., 2006, Viallis-Terrisse et al., 2001). However, the adsorption of $Ca^{2+}$ ions in the supersaturated pore solution creates a diffuse double layer around the hydrating SCDA particles inverting the surface charge to be positive (Elakneswaran et al., 2009; Zingg et al., 2008; Ma et al., 2012). This permits flocculation of colloids in the pore solution and subsequent precipitation of portlandite $(Ca(OH)_2)$ increasing the hydration of SCDA.

According to Table 5, the addition of welan gum increases the negative zeta potential of the colloidal suspension possibly due to the adsorption of carboxyl (—COON) and abundant hydroxyl (—OH) groups of welan gum to SCDA particles. Because of this, as shown in Table 5, addition of welan gum inverts the zeta potential of the colloidal suspension from positive to a negative value. The results of the zeta potential analysis also reveal that increasing welan gum content from 0.1% to 0.15% results in a further increase in the negative zeta potential from −12.56 mv to −27.5 mv and due to this enhanced negative charge, a stable colloidal suspension occurs in the pore solution of hydrating SCDA. In addition, the adsorption of welan gum molecules to SCDA particles and the resultant stable colloid suspension caused by negative zeta potential in the pore fluid hinder the formation of CSH gel and interfere with the precipitation of portlandite (Ma et al., 2012; Khayat and Yahia, 1997). This interaction between welan gum and hydrating SCDA particles causes the delayed onset of expansive pressure and the low strength gain observed. In addition, the high plasticity in hydrating SCDA with the addition of welan gum could also be partially due to the presence of imbibed and fixed water in the SCDA which results from the adhesion of polymer molecules to the periphery of water molecules (Khayat, 1998).

Temperature Change in Hydrating SCDA

Temperature change in the hydrating SCDA is also a useful parameter that can be used to judge the rate of hydration in SCDA. This is because the main chemical reaction of CaO hydration is exothermic in nature (Chatterji, 1995; Arshadnejad et al., 2011; Natanzi et al., 2016) and therefore, the temperature variation of hydrating SCDA gives a direct correlation with the hydration.

As shown in FIG. 12, different temperature profiles could be observed in SCDA when increasing the welan gum content. An initial spike can be found in the temperature plots, which is resultant from the nucleation of CSH gel upon the initial contact of alite with water (Bullard and Flatt, 2010). The subsequent temperature rise is due to the hydration heat of CaO (Harada et al., 1993). In the unmodified SCDA, a rapid increase in temperature could be observed as shown in FIG. 12. The observed temperature rise is concurrent with the onset of expansive pressure, which agrees well with the previous studies (Harada et al., 1993, Natanzi et al., 2016). Though a different temperature profile in SCDA could be observed for modified SCDA, no temperature spikes and gradual increase in the cement system temperature were observed. Moreover, increasing the welan gum content from 0.05% to 0.15% decreased the rising rate of temperature in the SCDA. Here, the gradual temperature increase in the modified SCDA indicates the delayed and prolonged hydration process caused by the interaction of SCDA particles with strands of welan gum.

Effect of Welan Gum on the Microstructure of Hydrating SCDA

A direct assessment of SEM images of both modified and unmodified SCDA obtained at the same time of hydration provides useful evidence to support the observed trends. The induced retardation by welan gum in SCDA was closely observed using SEM images captured at 6 hrs, 12 hrs, 16 hrs, 20 hrs and 24 hrs of hydration. A comparison of the captured microstructure of modified SCDA with unmodified SCDA is given in FIG. 13.

According to the results, at 6 hrs of hydration, a gel-like formation was observed with no particular crystal growth in the modified SCDA system (FIG. 13a) compared to the pure system. However, compared to the modified SCDA, three distinct formations including plates, needle-like protrusions and lumps were observed in the unmodified SCDA under the same time domain (FIG. 13b). These formations were identified as portlandite, ettringite and CSH gel, respectively, formed by the hydration of SCDA. The absence of these structures in the modified SCDA indicates the possible retardation caused by welan gum.

Figures 13C, 13D:
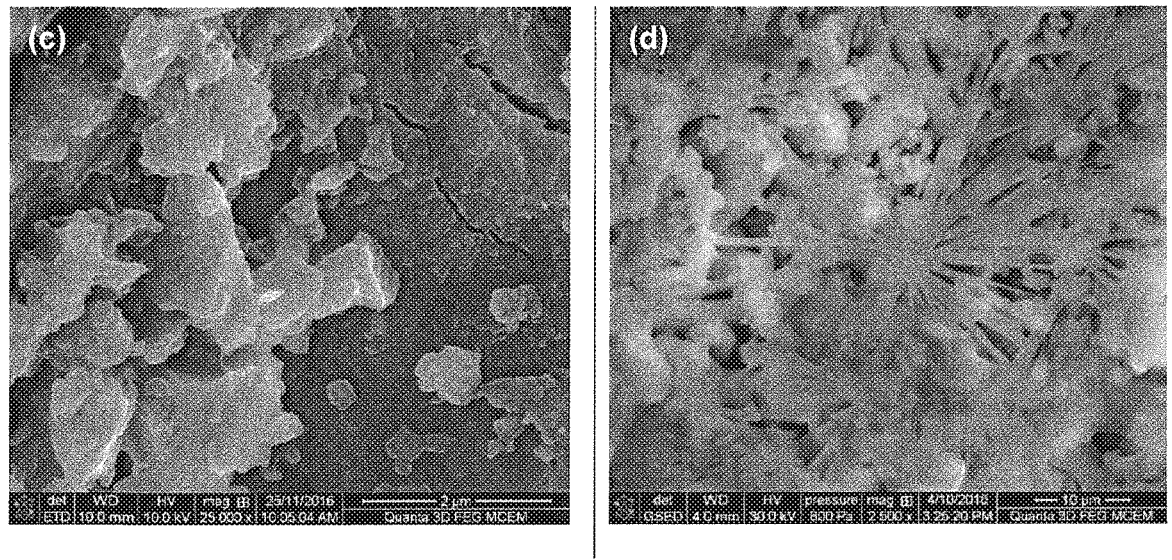
Figures 13E, 13F:
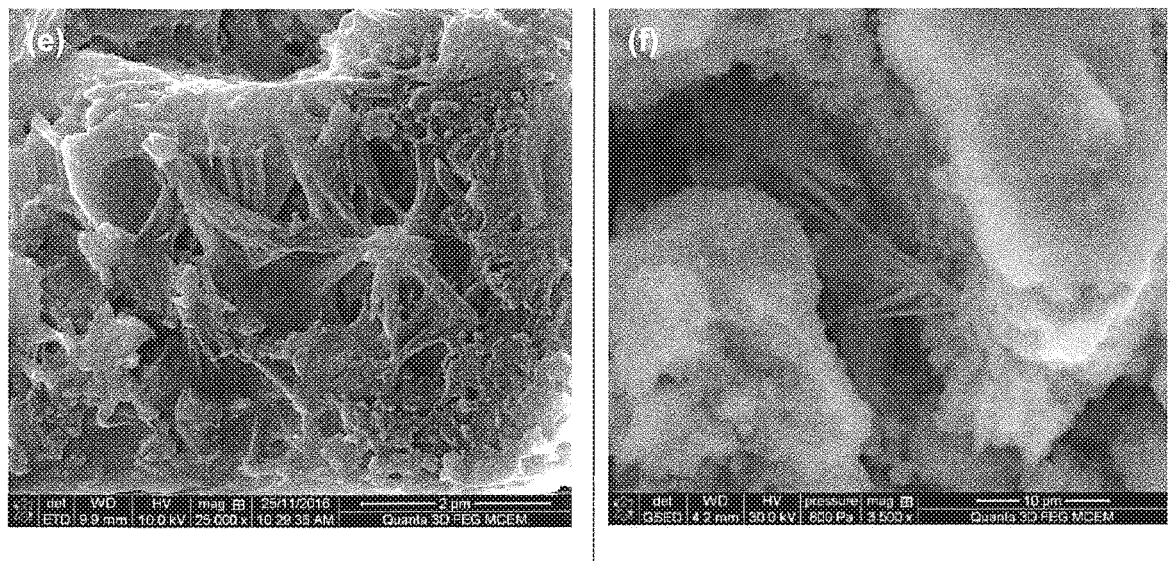
Figures 13G, 13H:
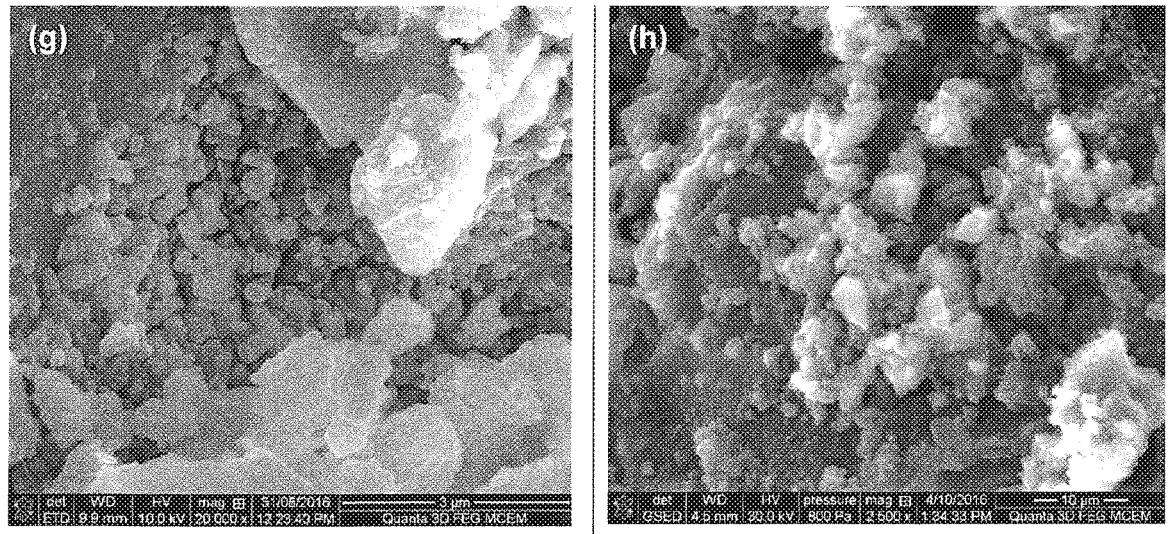

If 12 hrs hydration is considered, as shown in FIG. 13c, the initially observed layer of gel diminished and a platelike crystal formation merged with the gelling substance. This delayed formation of CSH gel and portlandite crystals are due to the adsorption of welan gum molecules to the cementing particles. At this stage, the unmodified SCDA system exhibits a denser formation of crystal structure as seen in FIG. 13d. A similar formation was evident in the modified SCDA only after 16 hrs of hydration (FIG. 13e). Further, the gradual development of portlandite crystals from $Ca(OH)_2$ precipitation with increasing time was also observed in the unmodified SCDA sample (FIGS. 13(f),(h), (j)). However, compared to the unmodified SCDA, a considerably smaller crystal structure was observed in the modified SCDA due to the welan gum-induced negative zeta potential and the hindered precipitation of $Ca(OH)_2$ (FIGS. 13g and 13h).

Figures 13I, 13J:
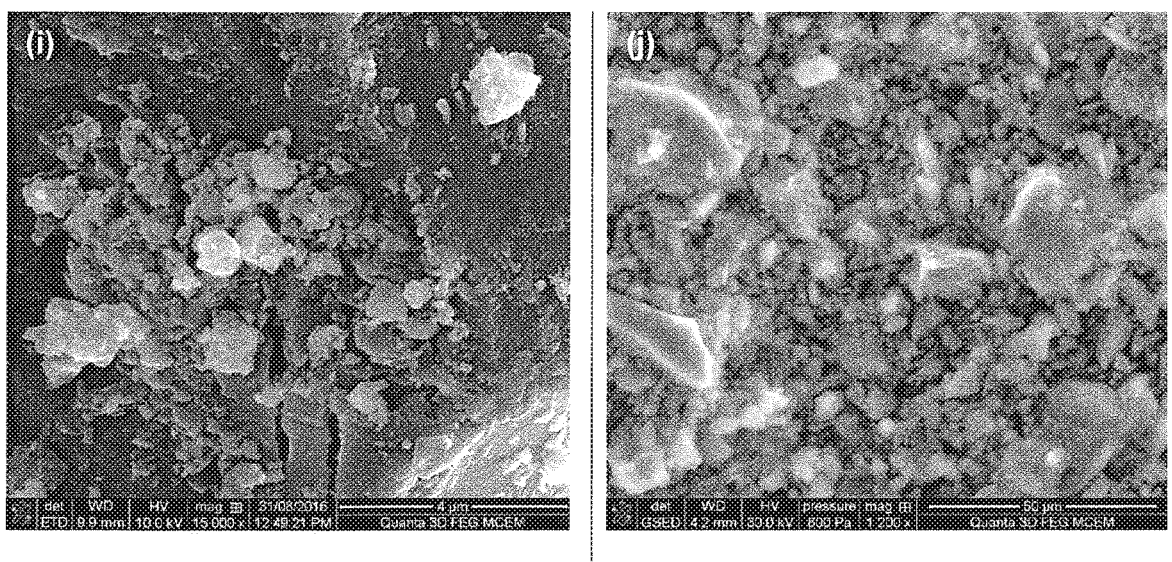

Comparison of the micrographs of modified and unmodified SCDA systems after 24 hrs of hydration can be used to identify the limited crystal growth occurred in the modified SCDA (refer FIG. 13i) and a more prominent and denser structure in the unmodified SCDA system (refer FIG. 13j). Such structure in the unmodified SCDA system has caused a greater expansive pressure generation after 24 hrs compared to the modified SCDA system (refer FIG. 7). The previously observed lower elastic properties and compressive strength of hydrating SCDA have also been caused by this crystal growth delay in modified SCDA. In addition, the high plasticity at 7 hrs of hydration (refer FIG. 8) is thought to be due to the gel-like layer formed through the interaction of VEA molecules (refer FIG. 13a).

Mineralogical Alteration Induced Due to the Introduction of Welan Gum

Figure 14A:
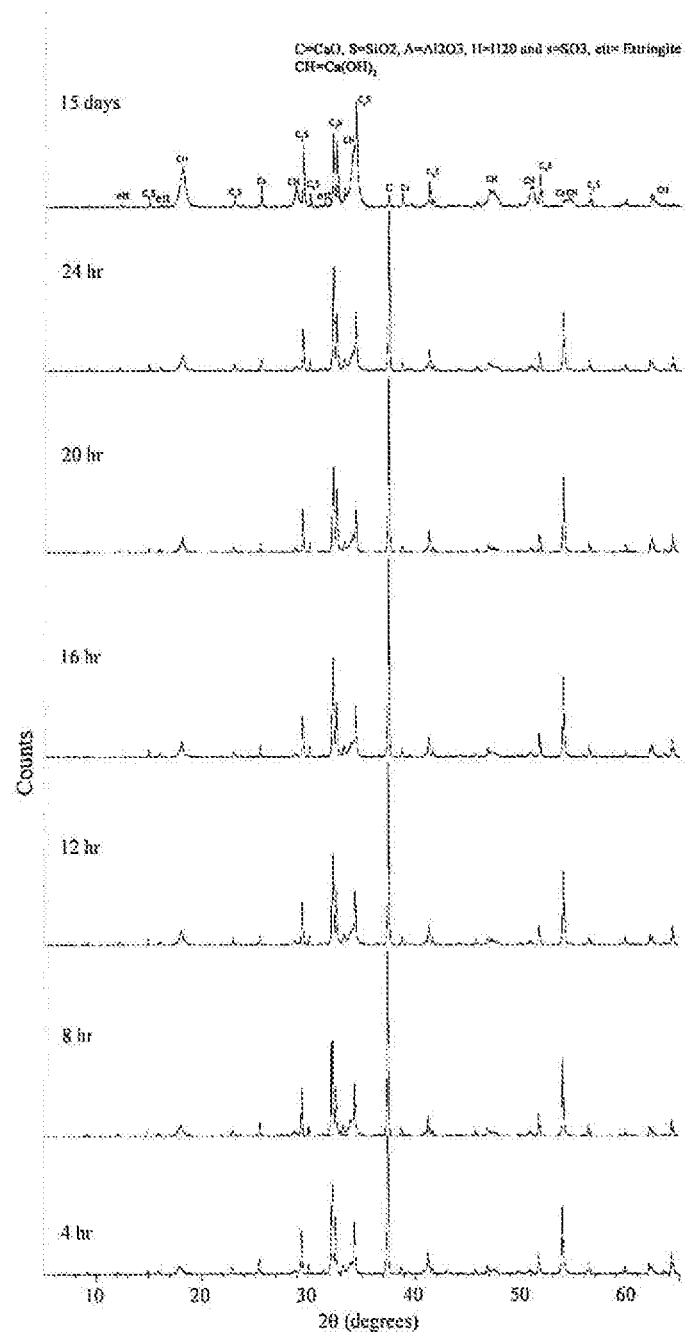
FIGS. 14a and 14b show X-Ray diffractograms (a) modified SCDA. (b) comparison of modified and unmodified SCDA.

A detailed investigation of the mineralogical morphology of SCDA during hydration was then carried out by performing a comprehensive XRD analysis under modified and unmodified conditions of SCDA. FIG. 14 shows the X-ray diffractograms of SCDA mixed with 0.1% of VEA, which were recorded at 4 hr, 8 hr, 12 hr, 16 hr, 20 hr, 24 hr, and 15 days of hydration. A significant reduction in CaO phase and the alite phase could not be observed for the modified SCDA with time. This confirms the retardation of SCDA hydration in the presence of VEA. The slight growth of the portlandite peak with increasing time represents the nucleation of $Ca(OH)_2$ crystals in the hydrating SCDA. FIG. 14 supports these observations.

Figure 14B:
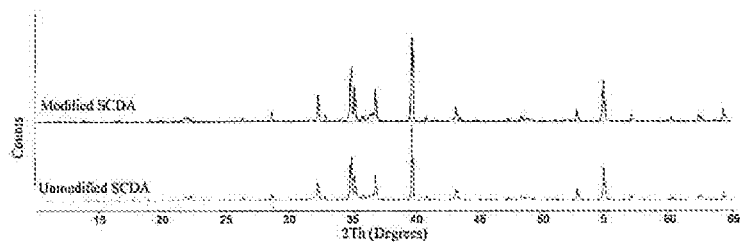
Figure 15:
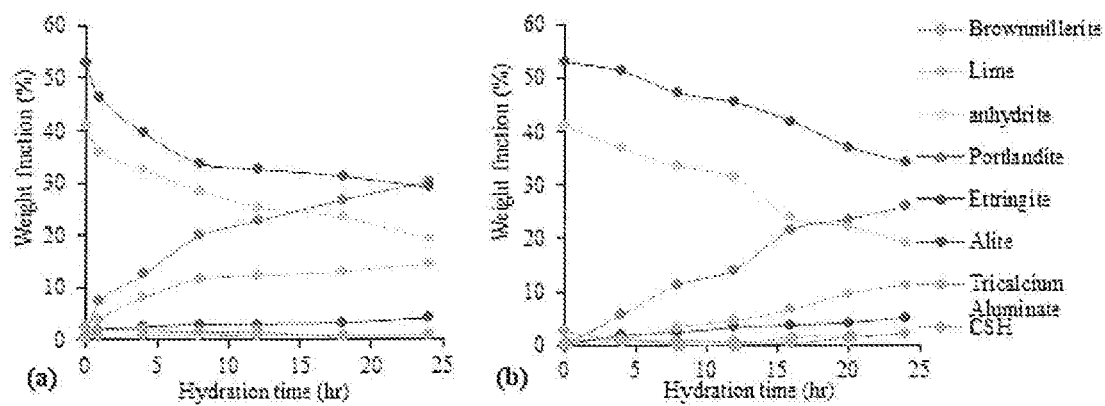
FIG. 15 is a graph of the mineralogical morphology of SCDA during hydration (a) unmodified SCDA, and (b) SCDA+0.1% welan gum.

The shape and the peak locations in the diffractograms of the modified SCDA are identical to those of the unmodified SCDA (refer FIG. 14b). This indicates that the addition of welan gum does not influence the hydration products of portlandite, calcium silicate hydrate, and ettringite in SCDA. A quantitative analysis of the XRD results were carried out based on Rietveld method using TOPAS 5.0 (Bruker) to precisely understand the effect of welan gum on the mineralogical morphology of SCDA. The amorphous CSH content was calculated using amorphous mass fraction computation proposed by Valentini (2013). FIGS. 15(a) and (b) illustrate the variation of the crystallography of the hydrating cement systems for unmodified SCDA and the modified SCDA, respectively.

As shown in FIG. 15(a), a rapid decline in the alite, and lime content was observed in the unmodified SCDA sample in the first four hours followed by a sudden nucleation of portlandite and CSH gel. The sudden temperature spike observed in the thermograph of hydrating SCDA (FIG. 12) confirms this mineralogical transformation caused by rapid lime and alite dissolution. In contrast, due to the adsorption of polymer molecules to cementing particles in the modified SCDA, the reductions of crystalline alite and CaO contents are significantly lower compared to unmodified SCDA and thus cause a subtle temperature rise as given in the thermograph (FIG. 12). The reduced reaction rate of alite (which is essential for expansive pressure development), as observed in FIG. 15b, causes a delay in the strength gain during the hydration of SCDA (FIG. 8). Furthermore, as indicated in FIG. 15b, the nucleation rate of portlandite crystals is significantly hindered due to the negative zeta potential in the pore solution as discussed hereinabove.

Figure 16:
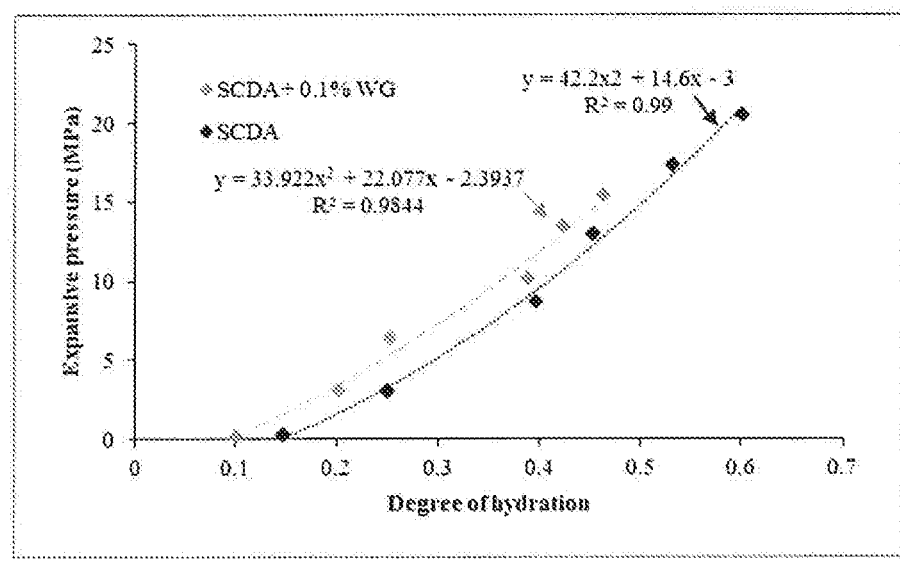
FIG. 16 is a graph of the relationship between of the expansive pressure and the degree of hydration in SCDA.

Finally, the degree of hydration of the modified SCDA at a given time was computed. This was calculated based on the fraction of the percentage of crystalline $Ca(OH)_2$ present in the system to the weight fraction of $Ca(OH)_2$ at the end of hydration after 15 days allowing sufficient time to complete the hydration process. FIG. 16 shows the relationship between the expansive pressure in SCDA and the degree of hydration of modified and unmodified SCDAs.

In addition, considering the spherical expansion mechanism for hydrating expansive cement (Ish-Shalom and Bentur, 1974; Ish-Shalom and Bentur, 1975; Chatterji, 1995), the degree of hydration at the start of the expansive pressure development, called critical degree of hydration, was obtained. For SCDA with 30% water content, this was found to be 0.15. According to the results, a lower critical degree of hydration of 0.11 was found for the modified SCDA with the same water content. This observation could be due to the viscosity enhancement occurring in the pore fluid in SCDA by welan gum. Since the pore solution in the modified system has a higher viscosity, a greater pressure development can be expected with a lower volumetric compression compared to the pore water in unmodified SCDA. Therefore, even under a lower degree of hydration, a greater expansive pressure development can be expected in the modified SCDA compared to unmodified SCDA irrespective of the retardation taking place.

All of these observations imply that the proposed method of combining SCDA with welan gum produces satisfactory results in terms of reducing the washout resistance under submerged conditions of a saturated reservoir rock, enabling it to be applied to fragmentation of saturated aquifer rock formation located in deep underground. The associated slowdown in the reaction rate, however, needs to be moderated for a better performance and will be discussed hereinbelow.

The series of investigations described above under Example 1 were conducted with the aim of identifying the performance enhancement of SCDA, particularly to be used in underground submerged aquifer rock fragmentation after combining with welan gum. Based on the experimental results, the following major conclusions can be drawn.

(i) The washout mass loss of SCDA can be effectively reduced by adding an anionic, high molecular weight, exopolysaccharide as welan gum. However, adding of welan gum causes some degradation in SCDA flowability.

(ii) Such flowability degradations can be effectively overcome by adding a correct proportion of high range water reducing admixture such as sodium salt of naphthalene formaldehyde sulfonic acid to the SCDA system. For instance, the conducted experiments show best performance in flowability with enhanced washout resistance in the presence of 0.1% of VEA and 1% of HRWR.

(iii) Compared to unmodified SCDA, a small increment of VEA in the modified SCDA (from 0.05% to 0.15%) results in significant reductions both in the onset of expansive pressure generation and the 24 hr expansive pressure.

(iv) Addition of welan gum and the admixture altered the SCDA mechanical properties. The compressive strength and elastic modulus of the modified SCDA tested with increasing time was significantly lower compared to those of the unmodified SCDA while the Poisson's ratio of the modified SCDA was always larger compared to that of the unmodified SCDA system. Addition of welan gum causes greater plasticity and delayed SCDA hydration.

(v) The strong adsorption potential of welan gum molecules to cement particles hinders the adsorption capability of Ca2+ ions into cementing particles and the negative zeta potential in the pore solution caused by the diffuse double layer affects the stabilisation of colloidal particles. This inhibits Ca(OH)2 precipitation and reduces the hydration rate and delays the expansive pressure generation in the modified SCDA.

(vi) SEM imaging, thermographs and XRD results confirmed the delayed hydration of SCDA modified with welan gum and this results in reduced expansive pressure generation. Therefore, further studies must be conducted to recover the hydration rate of SCDA (to achieve good expansive pressure development) while maintaining a good resistance to washout mass loss.

Example 2

The performance of SCDA under the influence of $CaCl_2$ was first evaluated. The mechanical, microstructural and mineralogical alterations occurring in modified SCDA upon introduction of $CaCl_2$ were evaluated by comparing the influence of $CaCl_2$ at pure SCDA environment. A comprehensive investigation of combined effect of the accelerator and VEA was then carried out to obtain a final product with enhanced washout resistance and accelerated expansive pressure generation rates, which can effectively and safely apply in mining and energy industry.

Materials

Bristar 100, one of the most commercialised SCDA products in the market was used as the base expansive cement as described above in respect of Example 1. Bristar 100 consists of around 42% lime, 53% alite and other minerals consisting $Al_2O_3$, $Fe_2O_3$, MgO and $CaSO_4$. The high content of alite in the SCDA controls the hydration rate of lime and the strength gain in SCDA slurry during hydration. A VEA with a pH of 7.0-9.0, bulk density of 500-700 kg/m$^3$ and a specific gravity of 1.45 was utilised along with the anhydrous chemical accelerator with 99% purity as the chemical accelerator for SCDA. The workability of the cement slurry was adjusted with naphthalene formaldehyde sulfonic acid, which is VEA compatible high range water reducer (HRWR).

Expansive Pressure Measurement

The experiments described hereinafter were initiated by investigating the influence of the accelerator on the expansive pressure generation rate of unmodified SCDA. The expansive pressure generated by hydrating unmodified SCDA was measured using outer pipe method (Harada et al., 1993). First, the accelerator was added to mixing water to make a solution. Unmodified SCDA was then made into a slurry by adding the prepared solution. A water content of 30% by weight of unmodified SCDA was maintained in the slurry. Immediately after mixing, the slurry was poured into the steel cylinders and the strain was measured using a non-contact digital image correlation system (ARAMIS®). Finally, the expansive pressure development of unmodified SCDA was calculated for CaCl$_2$ doses of 1%, 2%, 3% and 4% by weight of SCDA. The same procedure was repeated for modified SCDA by adding CaCl$_2$ to measure the expansive pressure generation. In order to recover the expansive pressure generated by SCDA, mixing-water combined with 0.1% of VEA and different doses of the chemical accelerator were added to SCDA.

The Measurement of Washout Resistance and Flowability

The percentages of VEA and the accelerator used to modify the SCDA for improved expansive pressure development were selected by conducting a series of experiments to determine the washout resistance and flowability of SCDA. Thus, washout resistance and flowability of modified SCDA under 49 different combinations of additives were evaluated to identify an additive combination to produce an SCDA which has similar flowability to unmodified SCDA. Under this task, the washout resistance and flowability of SCDA mixed with water (30% by weight of SCDA) having different combinations of the accelerator, VEA and HRWR was investigated. The modified CRD-C 661-06 test method was adopted to measure the washout mass loss and the mini slump flow test corresponding to ASTM C359 was used to measure the flowability (Kantro, 1980) of modified SCDA. The washout mass loss was measured as the total loss in the weight of SCDA at the end of four consecutive drops in a water column and the flow was measured in terms of the total spread from the slump test. An optimum combination of the accelerator, VEA and HRWR was identified from the experiments to produce an SCDA mix which is capable of rapidly generating an expansive pressure in submerged conditions.

Mechanical, microstructural and mineralogical testing on SCDA upon introduction of CaCl$_2$.

A series of experiments consisting of unconfined compressive strength (UCS) tests, X-ray diffraction (XRD) and scanning electron microscope (SEM) imaging were conducted to investigate the variation of mechanical properties, alterations in the microstructure and the changes in mineralogy upon introduction of chemical accelerator and its influence on the hydration process of modified and unmodified SCDA. For UCS tests, SCDA specimens were prepared by pouring the slurry into steel moulds to allow for hydration under a lateral restraint and UCS tests were carried out on the samples once the desired hydration time was reached.

These observations revealed promising results which were then used to explain the pressure development characteristics of SCDA under the combined influence of the chemical accelerator and VEA.

In order to capture the variation in the hydration reaction rates caused by the chemical accelerator, XRD tests were conducted on two target samples. The first series of XRD tests was carried out on an unmodified SCDA sample mixed with 2% of the accelerator. Diffractograms were recorded within the first 10 hrs of hydration at 2 hr intervals so that the mineralogical transformation due to the rapid hydration could be captured. A second series of tests were carried out using the same method by adding 2% of the accelerator to an SCDA modified for enhanced washout resistance which had 0.1% VEA and 2.5% HRWR.

A detailed quantitative analysis of the mineral phases present in the SCDA system was carried out by Rietveld analysis of the diffraction data using TOPAS 5.0 (Bruker). Out of the main hydration products resulting from alite and lime hydration, the amorphous calcium silicate hydrate (CSH) cannot be directly detected by X-ray diffraction. The quantification of all solid phases including the amorphous CSH in hydrating SCDA was performed using a combination of Rietveld analysis and amorphous mass fraction computation. Valentini (2013), and Valentini et al. (2015) provide a detailed description of the adopted methodology.

The Influence of CaCl$_2$ on the Expansive Pressure Generation of SCDA

Figure 17:
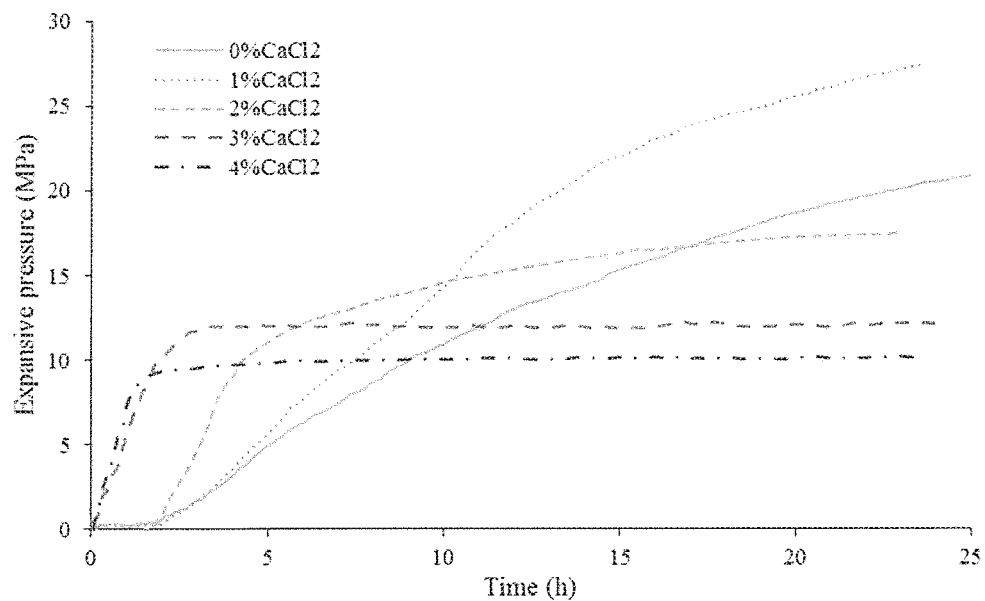
FIG. 17 is a graph of expansive pressure development with increasing $CaCl_2$ concentration.

The expansive pressure evolution of SCDA with increasing accelerator dosage is shown in FIG. 17. As seen in FIG. 17, a sudden increase in the rate of expansive pressure development was found with the increase of dose from 1% to 4%. Nevertheless, at high concentrations of the accelerator (3-4%) the SCDA hydration reaction was found to be highly volatile and resulted in a rapid increase in the temperature which further accelerated the hydration reaction. As a result, the volumetric expansion of SCDA seems to occur within a very short period (few minutes) after mixing with water, which made the SCDA impractical at high accelerator concentrations. The reason behind this temperature rise and rapid expansion is due to the faster nucleation of Ca(OH)$_2$ caused by the disruption of the CSH gel barrier formed around alite present in the SCDA system (Cheeseman and Asavapisit, 1999). The mechanism of this increased rate of expansion will be further discussed hereinbelow.

As shown in FIG. 17, the expansive pressure development profile of SCDA varies with increasing accelerator dosage, but does not necessarily increase the expansive pressure generated with the increase of accelerator dosage. Compared to the controlled system, which was hydrated only with water, addition of 1% accelerator to the mixing water showed a significant increase in the generated expansive pressure (FIG. 17). However, at this concentration, the onset of expansive pressure development is similar to that of SCDA without the accelerator (2 hrs). Increasing the accelerator concentration to 2% shows a drastic increase in the expansive pressure development in SCDA. As shown in FIG. 17, at 5 hrs of hydration an expansive pressure of 11 MPa was observed which is over a twofold increase compared to unmodified SCDA. However, subsequent pressure development rate seems to diminish after the initial spike. This behaviour of SCDA was more pronounced with the increase of accelerator concentration up to 4%. According to the results, higher contents resulted in immediate volume expansion of SCDA, leading to a relatively high rate of expansive pressure generation, nevertheless the peak expansive pressure developed showed a considerable drop and remained at a constant value.

The observed low peak expansive pressure development under high concentrations of the accelerator is in part due to the quick hydration reaction of SCDA, which causes a significant volume expansion in the time between mixing the SCDA and transferring the slurry to the expansion pressure measuring cylinder. In addition, induced mechanical, microstructural and mineralogical alterations upon mixing the accelerator may have significant influence on the observed variation of expansive pressure development profile, which is discussed herein below.

Figure 18:
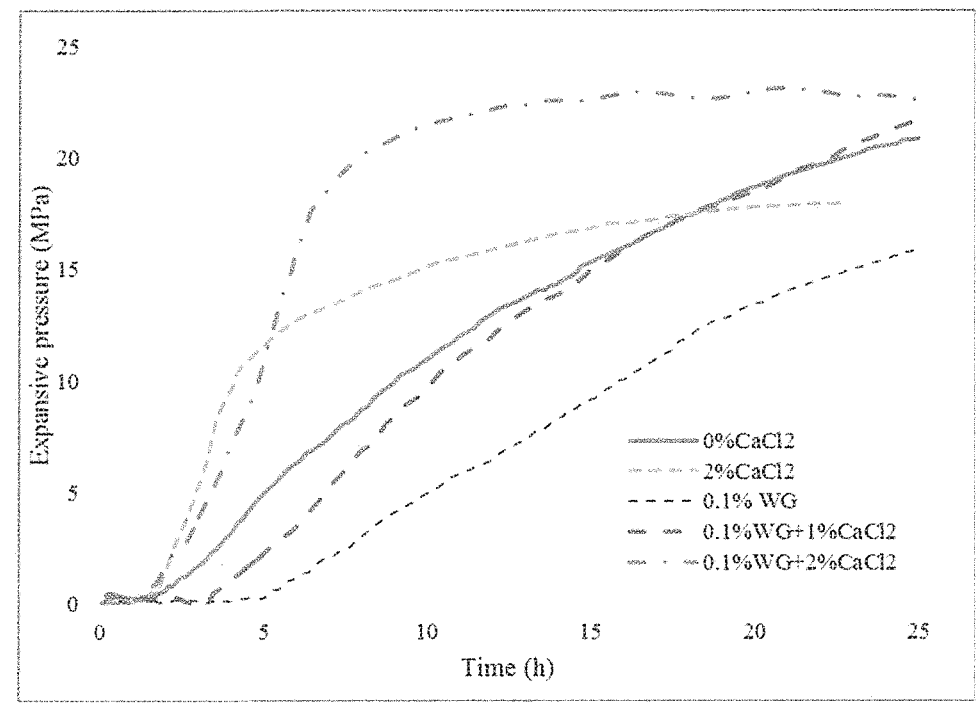
FIG. 18 is a graph of the combined effect of VEA and $CaCl_2$ on the expansive pressure development of SCDA.

FIG. 18 shows the comparison of expansive pressure development in SCDA with the addition of accelerator without VEA, VEA without accelerator and two combinations of the accelerator and VEA doses. The optimum content of VEA, which is 0.1% by weight of SCDA was selected based on a previous study. It is known that the addition of VEAs retards the hydration reaction in cement systems (Khayat, 1995, Khayat and Yahia, 1997, Khayat, 1998). Similar effects were observed in hydrating SCDA, where a delay in the onset of expansive pressure was found due to the adsorption of VEA molecules to the hydrating SCDA particles. According to FIG. 18, adding just 1% of accelerator to SCDA with VEA (washout resistance enhanced) showed a significant recovery of the onset of expansive pressure (reduces from 5 hrs to 3.8 hrs) and the peak expansive pressure developed at 24 hrs displayed a similar trend as unmodified SCDA (0% $CaCl_2$). A further increase in the accelerator content to 2% in the SCDA containing VEA caused a significant increase in the onset of expansive pressure, allowing the development of an expansive pressure of over 20 MPa after only 8 hrs of hydration.

Washout Resistance and Flowability of Modified SCDA

The VEA is capable of reducing the washout mass loss of a cement system by the binding of polymer chains to adjoining water molecules in the cement slurry (Allen et al., 1991; Khayat and Yahia, 1997; Khayat and Saric-Coric, 2000; Sakata et al., 2003; Ma et al., 2012). Based on a series of experiments conducted, the inventors have concluded that combining VEA and a compatible water reducing admixture with the mixing water of SCDA produces a system with high washout resistance while retaining a flowability similar to that of an unmodified SCDA system. However, adding the accelerator to the system to accelerate the hydration reaction of SCDA results in a significant deterioration of the flowability. The results obtained from washout resistance and flowability tests of SCDA are summarised in Table 6 below:

TABLE 6

Washout resistance and flowability of SCDA with varying $CaCl_2$ content

| $CaCl_2$ (%) | Welan gum (%) | HRWR (%) | Cumulative mass loss (g) | Washout loss (%) | Flow (mm) |
|---|---|---|---|---|---|
| 0 | 0 | 0 | 21.93 | 35.67014 | 68.12 |
|   | 0.05 | 0 | 2.11 | 3.607454 | 44.36 |
|   |   | 0.5 | 4.22 | 7.921907 | 52.64 |
|   |   | 1 | 24.05 | 42.40875 | 61.95 |
|   |   | 1.5 | 47.95 | 56.16069 | 73.01 |
|   | 0.1 | 0 | 2.09 | 3.304348 | 40.23 |
|   |   | 0.5 | 3.35 | 5.621749 | 50.98 |
|   |   | 1 | 14.52 | 23.43069 | 60.27 |
|   |   | 1.5 | 27.08 | 39.6428 | 64.82 |

TABLE 6-continued

Washout resistance and flowability of SCDA with varying $CaCl_2$ content

| $CaCl_2$ (%) | Welan gum (%) | HRWR (%) | Cumulative mass loss (g) | Washout loss (%) | Flow (mm) |
|---|---|---|---|---|---|
|   | 0.15 | 0 | 0.88 | 1.396604 | 40.31 |
|   |   | 0.5 | 1.41 | 2.296043 | 47.11 |
|   |   | 1 | 2.54 | 4.104719 | 51.79 |
|   |   | 1.5 | 3.78 | 6.142346 | 54.66 |
| 1 | 0.05 | 0 | 2.61 | 4.154728 | 38.79 |
|   |   | 0.5 | 4.05 | 6.850474 | 49.95 |
|   |   | 1 | 4.81 | 8.967189 | 53.87 |
|   |   | 1.5 | 4.37 | 9.258475 | 60.23 |
|   |   | 2 | 6.39 | 10.08841 | 64.64 |
|   |   | 2.5 | 7.66 | 14.00878 | 68.78 |
|   | 0.1 | 0 | 1.71 | 1.516603 | 38.63 |
|   |   | 0.5 | 1.82 | 2.735711 | 41.12 |
|   |   | 1 | 3.85 | 3.225806 | 52.48 |
|   |   | 1.5 | 4.1 | 4.16984 | 55.26 |
|   |   | 2 | 4.92 | 4.909119 | 58.43 |
|   |   | 2.5 | 6.57 | 7.494426 | 62.75 |
|   | 0.15 | 0 | 0.7 | 0.777706 | 38.35 |
|   |   | 0.5 | 1.03 | 1.864133 | 39.39 |
|   |   | 1 | 2.77 | 2.524917 | 40.74 |
|   |   | 1.5 | 2.61 | 3.235193 | 53.51 |
|   |   | 2 | 4.67 | 3.791836 | 56.35 |
|   |   | 2.5 | 6.02 | 5.25943 | 58 |
| 2 | 0.05 | 0 | 1.7 | 2.671696 | 38.23 |
|   |   | 0.5 | 3.25 | 6.030803 | 50.34 |
|   |   | 1 | 2.95 | 6.277931 | 52.26 |
|   |   | 1.5 | 5.41 | 8.369431 | 57.98 |
|   |   | 2 | 4.8 | 8.665824 | 61.76 |
|   |   | 2.5 | 6.98 | 11.5793 | 64.02 |
|   | 0.1 | 0 | 0.95 | 1.516603 | 38.55 |
|   |   | 0.5 | 1.68 | 2.735711 | 39.32 |
|   |   | 1 | 1.82 | 3.225806 | 40.12 |
|   |   | 1.5 | 2.19 | 4.16984 | 48.41 |
|   |   | 2 | 3.16 | 4.909119 | 51.67 |
|   |   | 2.5 | 4.37 | 7.494426 | 60.11 |
|   | 0.15 | 0 | 0.48 | 0.76494 | 38.47 |
|   |   | 0.5 | 1.04 | 1.843318 | 38.84 |
|   |   | 1 | 1.52 | 2.51739 | 39.19 |
|   |   | 1.5 | 1.89 | 3.164239 | 40.27 |
|   |   | 2 | 1.96 | 3.775039 | 45.12 |
|   |   | 2.5 | 2.97 | 5.28752 | 53.61 |

Based on the expansive pressure generation graphs, accelerator doses of 2% and 3% were selected to investigate the combined effect of the accelerator, VEA and HRWR on the washout resistance and flowability of modified SCDA. With the addition of the accelerator, a steep reduction in both washout mass loss and flowability was observed. This reduction in flowability could be a product of the faster consumption of free water by the hydrating particles in the SCDA system. According to Table 6, absence of HRWR in the system, creates almost a no flow condition. Where a flow less than 39 mm based on 38 mm slump cone diameter was observed. Nevertheless, a significant improvement in the flowability was observed with the introduction of the HRWR to SCDA, where a significant improvement in the flowability was observed.

Figure 19:
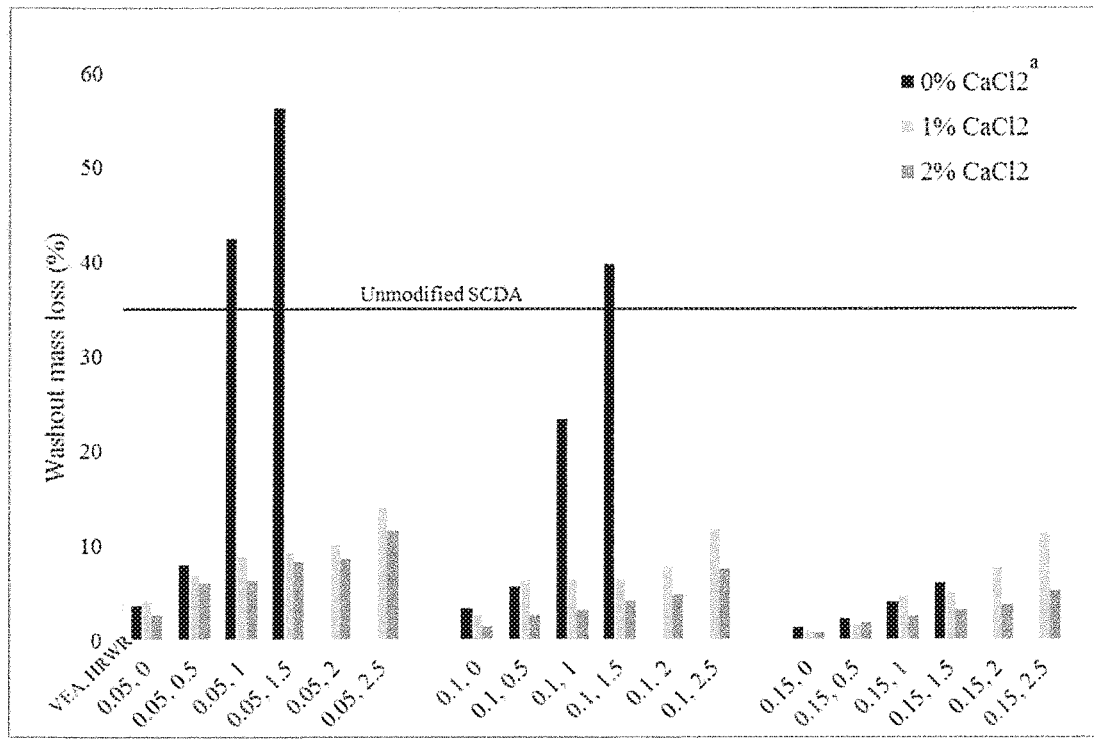
FIG. 19 is a graph of the washout mass loss of SCDA with varying $CaCl_2$ content.

Shown in FIG. 19 is the washout mass loss of SCDA with different accelerator concentrations with increasing VEA and HRWR dosage. In comparison with the SCDA system without the accelerator, low washout mass losses were observed for systems with the accelerator. In modified SCDA system for enhanced washout resistance, the addition of HRWR beyond 1% by weight of SCDA resulted in excessive washout mass loss at VEA contents of 0.05% and 1%. However, this phenomenon seems to curtail with the introduction of the accelerator to the SCDA system. According to the results, the washout mass resistance improves with increasing accelerator concentration for all SCDA mixes tested. Compared to the unmodified SCDA system, the washout mass loss of systems containing all three additives (chemical accelerator, VEA and HRWR) showed a substantial improvement in washout resistance, which is clearly seen in FIG. 19.

Figure 20:
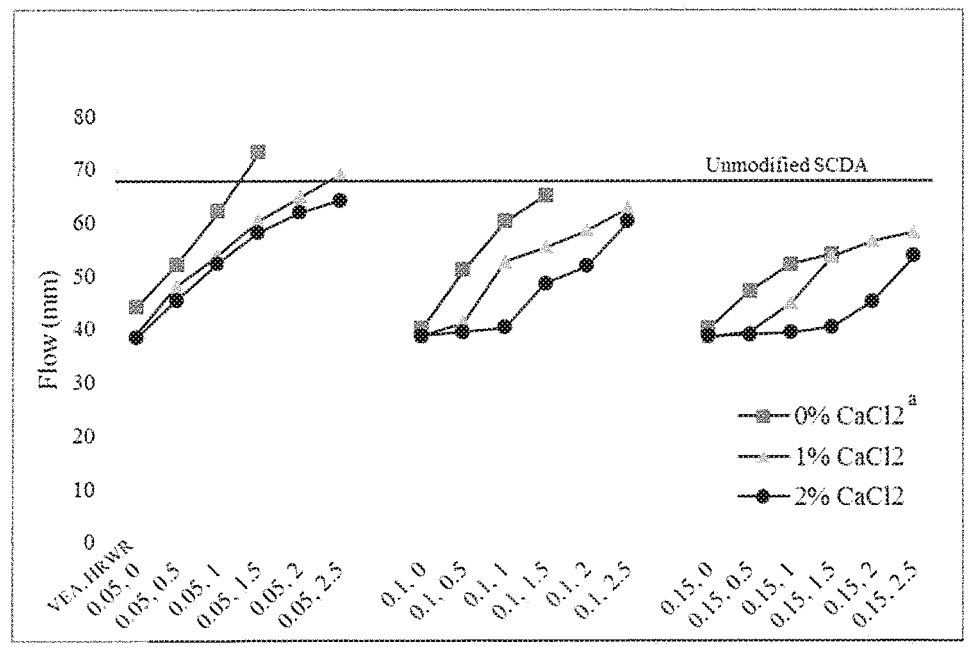
FIG. 20 is a graph of the influence of $CaCl_2$ on the flowability of SCDA.
Figure 21:
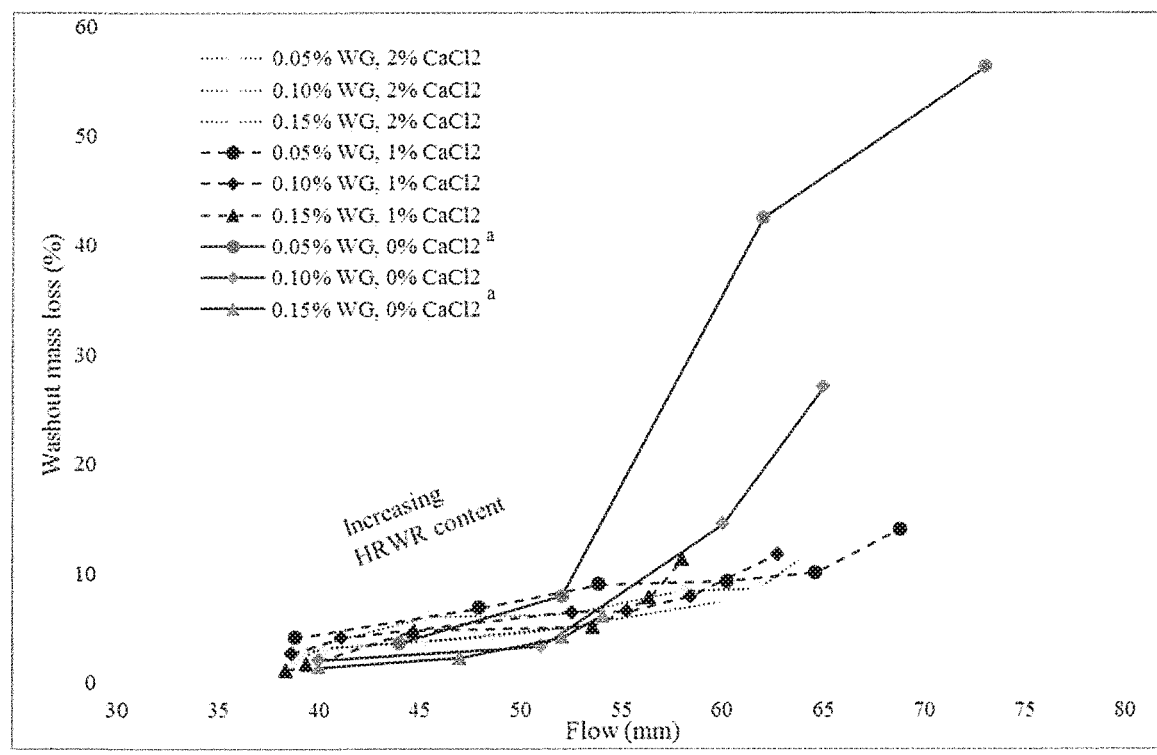
FIG. 21 is a graph of the relationship of washout resistance and flow with different $CaCl_2$ contents.

The improved washout mass loss, however, led to decreased flowability of SCDA. Depicted in FIG. 20 is the measured flow of SCDA having different contents of the accelerator, VEA and HRWR. Even with increasing dose of HRWR, it is found that the flow in systems containing the accelerator is considerably lower compared to those without. FIG. 21 shows the variation of washout mass loss and the flow of SCDA with increasing accelerator content. It is evident that, although the accelerator favours the washout resistance of SCDA, its flowability substantially decreases upon introduction of the accelerator. The loss of fluidity could be a result of the rapid nucleation of localized CSH gel clusters in the SCDA system, which causes greater initial hydration (Peterson and Juenger, 2006; Thomas et al., 2009), and reducing the free water content in the SCDA system. According to the results, SCDA mixed with 0.1% VEA, 2% accelerator and 2.5% HRWR meets the desired characteristics for the application of SCDA in submerged conditions, in accordance with the present invention. Therefore, SCDA with this combination of additives was selected to determine the variation of strength properties of the modified system during hydration considering the flowability, washout resistance characteristics and the potential of expansive pressure generation. A comparison of the performance of the modified SCDA and unmodified SCDA is shown in Table 7 below:

demonstrate extreme plasticity with very low peak strength values of 0.84 MPa at an axial strain of 5.6%. Moreover, the compressive strength found to increase with increasing hydration time where a peak UCS value of 8.3 MPa was observed at 28 hrs of hydration. It is also found that the delayed onset of expansive pressure and the low expansive pressure generated are an outcome of the low strength and high plasticity of SCDA at early stages of hydration.

Figure 22A:
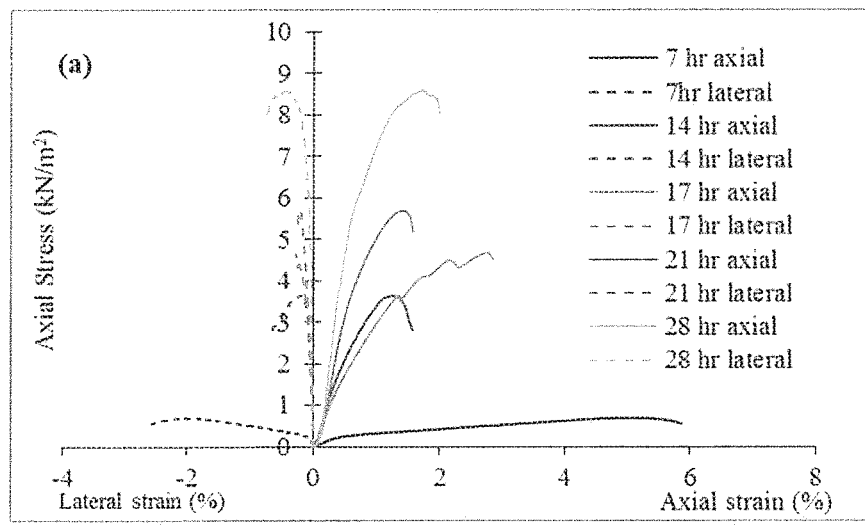
FIGS. 22a, 22b and 22c are graphs of the stress-strain behaviour of hydrating SCDA samples (a) SCDA mixed with 0.1% VEA; (b) SCDA mixed with 2% $CaCl_2$, and (c) SCDA mixed with 0.1% VEA and 2% $CaCl_2$.
Figure 22B:
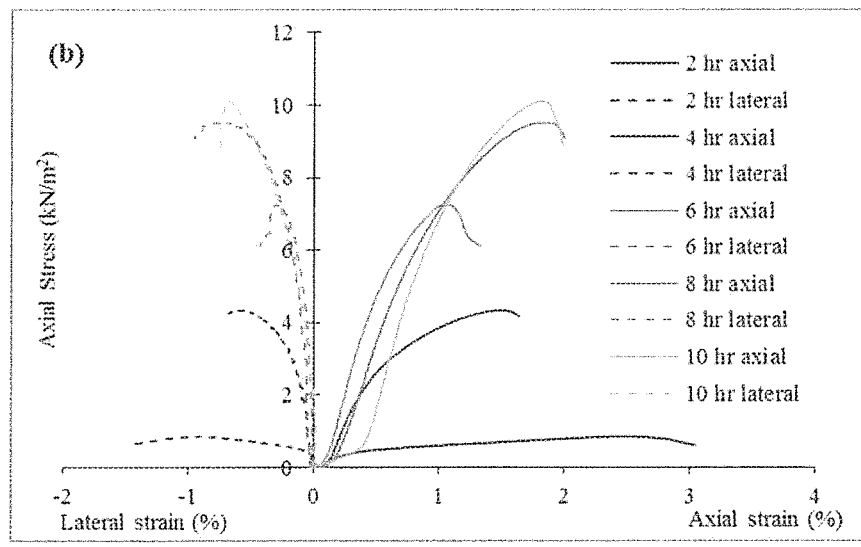

This testing has revealed that the presence of chemical accelerator alters the strength properties of SCDA by achieving higher strengths at lower hydration times. For instance, peak UCS value of 10.1 MPa was observed after only 10 hrs of hydration in the system containing 2% of accelerator. This enhanced strength properties of SCDA is found to be due to the accelerated hydration of SCDA taking place in the presence of the chemical accelerator. As shown in FIG. 22*b*, SCDA samples were highly plastic, because they show large axial and lateral deformations within the first two hours of hydration under uniaxial compression (peak strain of 2.7%). The subsequent samples tested after two hours of hydration exhibited a more brittle failure with axial strains less than 2% at failure.

Figure 22C:
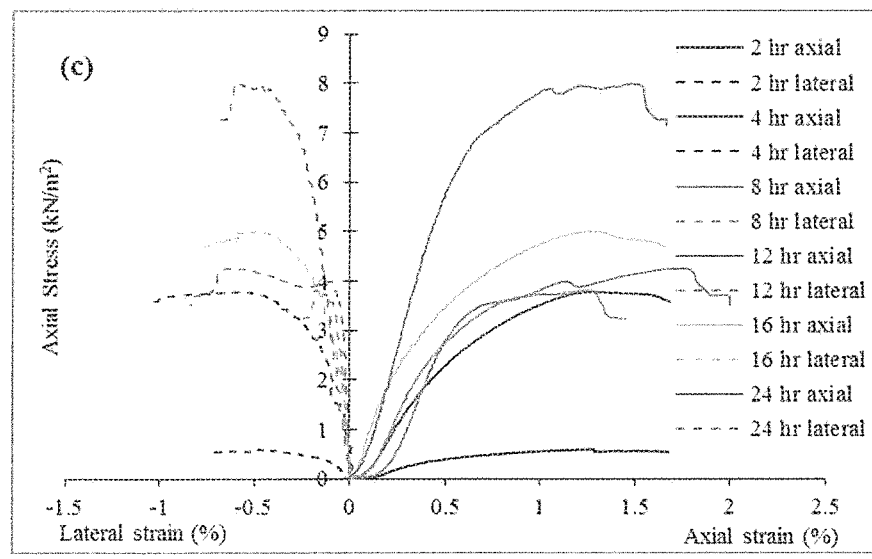

FIG. 22*c* shows the stress-strain behaviour of 24 hrs hydrated modified SCDA with 2% of the accelerator. Here, 2% of the accelerator was introduced to the system to reduce the retardation of the hydration reaction of SCDA when combined with VEA. The combination of VEA and the accelerator in the SCDA system produced interesting results where, a considerable strength gain was observed in SCDA at early hours of hydration (from 2 hrs to 8 hrs), refer FIG. 23, and demonstrated highly plastic behaviour near peak strength in all samples tested. Upon reaching the peak

TABLE 7

A comparison of the performance of the modified SCDA and unmodified SCDA.

| Sample | Washout loss (%) | Flow (mm) | Onset of expansive pressure (hr) | Expansive pressure (MPa) | | Rate of initial expansive pressure development (MPa/hr) |
| --- | --- | --- | --- | --- | --- | --- |
| | | | | 5 hrs of hydration | 24 hrs of hydration | |
| Unmodified SCDA | 35.67 | 68.12 | 2.00 | 4.97 | 20.52 | 1.50 |
| Modified SCDA | 7.49 | 60.11 | 0.96 | 12.32 | 22.8 | 2.17 |
| Improvement (%) | 79 | −11.76 | 52 | 147.89 | 11.11 | 44.67 |

Variation of Mechanical Properties

The potential for the development of an expansive pressure is dependent on the initial strength gain of SCDA caused by the hydration of alite in the system (Soeda and Harada, 1993). Therefore, to understand the influence of hydration characteristics on the strength variation of SCDA specimens, the stress-strain results of a sequence of UCS tests conducted on SCDA specimens at different hydration times were analysed. FIGS. 22*a*, 22*b* and 22*c* show the stress-strain variation of three sets of hydrating SCDA specimens having different combinations of the accelerator, VEA and HRWR.

According to De Silva et al. (2017b), the compressive strength of the specimens decreases when VEA is introduced to the SCDA system due to the retardation of SCDA hydration, which further results in a delayed onset of expansive pressure. FIG. 22*a* illustrates the stress-strain behaviour of hydrating SCDA samples mixed with 0.1% VEA. As seen in FIG. 22, even after 7 hours of hydration, the samples strength, samples containing both VEA and the accelerator under went with strain softening without a significant increase in the peak strength demonstrating a quasi-ductile behaviour.

Figure 23:
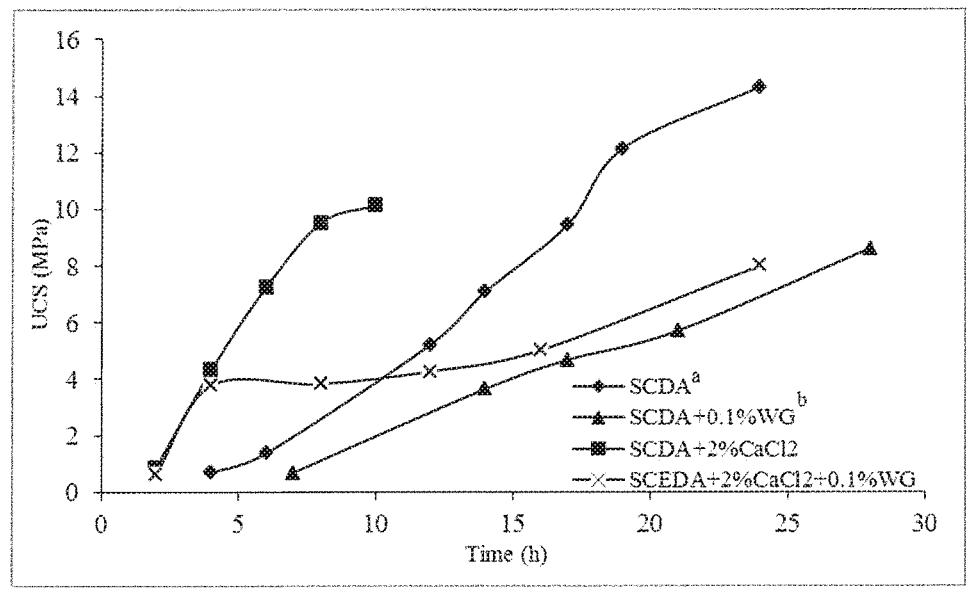
FIG. 23 is a graph of time dependent strength development of different SCDA combinations.
Figure 24:
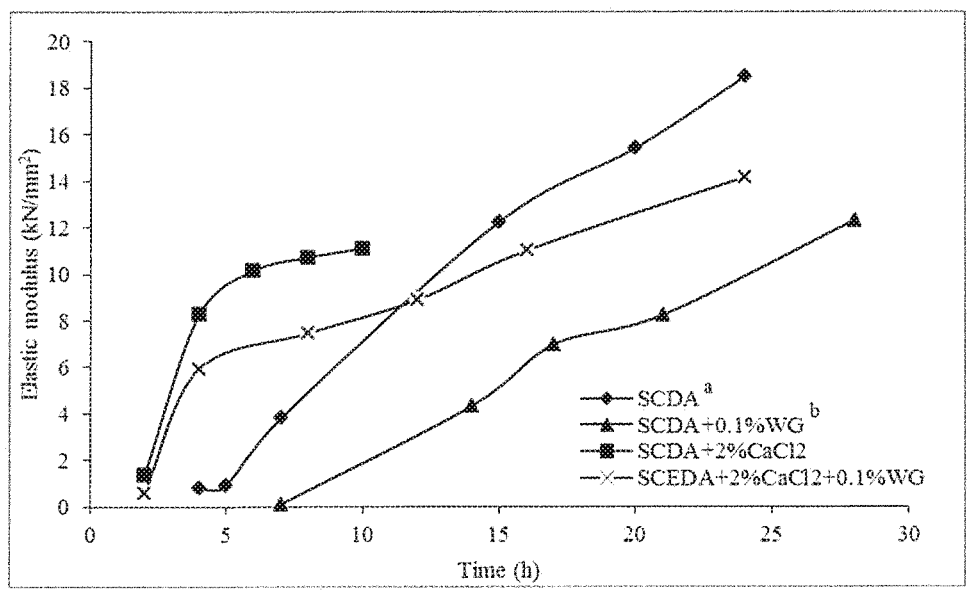
FIG. 24 is a graph of the variation of elastic modulus of SCDA with hydration time.

As shown in FIG. 23, for SCDA containing 2% of the accelerator a rapid strength development can be observed up to 8 hrs and a reduction in the strength gain at 10 hrs after hydration were observed. When the same dose of the accelerator was introduced to the system comprising VEA, a quick strength gain was observed until 4 hrs of hydration followed by a reduction in the increment of peak strength with time. This strength development pattern of SCDA is remarkably similar to the observed expansive pressure development curves (FIG. 16) which further rationalises the relationship between expansive pressure and strength development. Compared to the unmodified SCDA system, the modified system having both the accelerator and VEA attains lower strength values after 10 hrs of hydration (FIG. 23). This trend was consistent with the observed elastic moduli of hydrating SCDA systems as well (FIG. 24). The observed reduction trends of strength and Elastic modulus in the modified SCDA system is probably due to the bonding of free water to VEA molecules present in the modified system which causes slip between hydrating particles during unconfined compression testing. Such occurrence in turn may result in a reduction of the ultimate strength and the Elastic modulus of the modified system compared to the unmodified SCDA system. The same mechanism may be attributed to the large plastic deformations observed in the modified system near failure (FIG. 22c).

Figure 25:
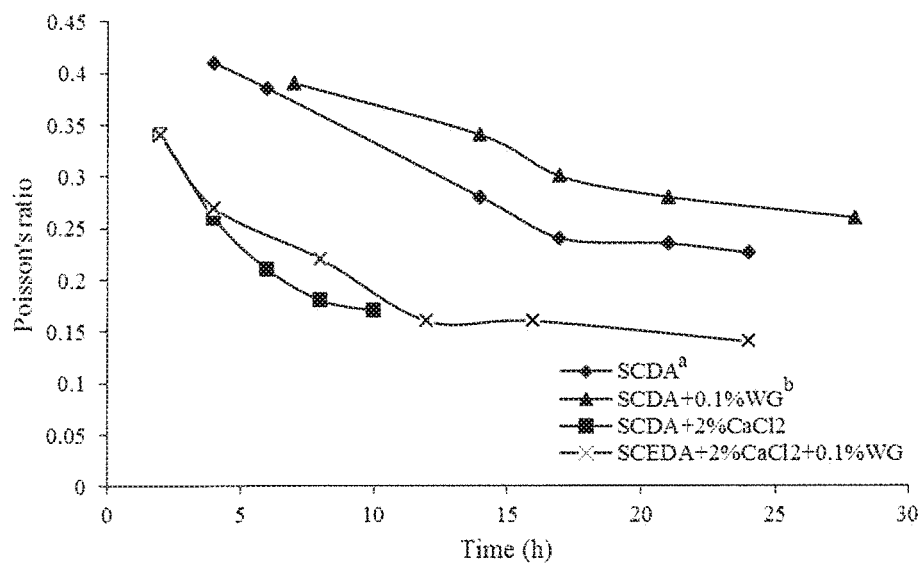
FIG. 25 is a graph of the variation of Poisson's ratio of SCDA with hydration time.

The variation of the Poisson's ratio of different SCDA mixes is given in FIG. 25. According to the results, addition of the accelerator to the SCDA systems causes the rapid hydration, resulting in large reduction in the Poisson's ratios of the specimens. These alterations in the mechanical properties of SCDA system upon introduction of the accelerator can be further explained considering the mineralogical and microstructural changes occurred during hydration process. Influence of the accelerator on the mineralogical and microstructural properties of SCDA.

Figure 26:
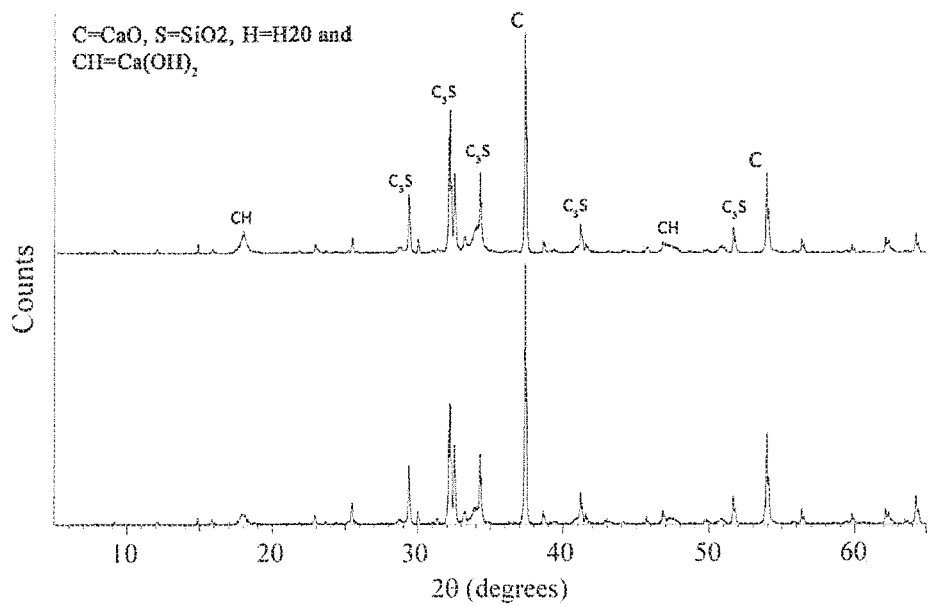
FIG. 26 shows X-ray diffractograms of SCDA, top: SCDA+2% $CaCl_2$ at 4 hrs hydration, bottom: Unmodified SCDA at 4 hrs hydration.

To date, how the selected chemical accelerates the hydration reactions of cement systems are not fully understood (Diamond and Lopez-Flores, 1981; Juenger et al., 2005; Peterson and Juenger, 2006; Thomas et al., 2009). The low $Al_2O_3$ content found in SCDA (refer Table 1) makes SCDA similar to a silicate cement system. In silicate cement systems, where the hydration process is dominated by Eq [1] and [2], the accelerator only increases the reaction rate, but no change to the chemical reactions are observed (Ramachandran, 1971, Brown et al., 1986, Thomas et al., 2009). The XRD diffractograms recorded for hydrated SCDA both in the presence and the absence of the accelerator confirmed the argument above, showing similar peaks under both conditions and this is illustrated in FIG. 26.

The influence of additives on the mineralogy of hydrating SCDA can be explained using XRD results. According to the results in FIG. 26, the peak intensities for $Ca(OH)_2$ for the system having the accelerator was noticeably higher than that of the unmodified SCDA at similar hydration times.

The present investigation found the additives introduced to the system did not change the final hydration products and therefore, the hydration reactions given by Eqs. [1], [2] and [3] can be considered to prevail in the hydrating SCDA system. FIGS. 27a, 27b, 27c and 27d show a comparison of the variation in mineralogy of hydrating SCDA with additives.

As illustrated in FIG. 27, substantial changes in the mass fractions of alite, free lime, portlandite and CSH were observed in all samples. The amount of alite and free lime hydration and the subsequent nucleation of CSH and portlandite well explain the expansive pressure generation profiles observed for the various SCDA mixes produced (FIG. 18). In the unmodified SCDA system (FIG. 27a), a proportional decrease in the alite and lime content can be seen, which indicates the dissolution and hydration process of alite and lime. However, according to FIG. 27b, a retardation can be seen in the lime and alite hydration due to the addition of VEA to SCDA.

According to FIG. 27c, an accelerated reaction rate in SCDA was clearly evident with the addition of the chemical accelerator in the initial stage of hydration causing the rapid expansive pressure generation at early stages. According to the results, although a continuous hydration of lime was observed (which is responsible for the volume expansion) hydration rate of alite in this system displayed a decline after 6 hrs of hydration. This peculiar behaviour of SCDA was reflected in the evaluation of its strength properties, where both UCS (FIG. 23) and elastic modulus (FIG. 24) seem to level off after 6 hrs of hydration. The Poisson's ratio also displayed a similar trend (FIG. 25), where a steep reduction was observed due to the hardening effect of alite hydration followed by a constant trend (value around 0.18) after 6 hrs of hydration.

As clearly seen in FIG. 27c, although the lime hydration seems to continue and the mass fraction reduces to 10% at 10 hrs of hydration, resulting in a volumetric expansion. However, further development of expansive pressure is jeopardized by the reduced rate of alite hydration, which is also responsible for the strength development in the SCDA structure. According to the results, at higher accelerator concentrations, the reaction rate of lime further increases compared to the hydration of alite, resulting in a rapid expansive pressure development with a lower peak value as observed in FIG. 17. The reason for this behaviour is explained hereinbelow in detail with reference to SEM results.

It is found that combining of VEA with the accelerator enhances the performance of SCDA. Depicted in FIG. 27d is the mineralogical alteration in SCDA when the accelerator is added to a system containing VEA. Compared to the percentage reduction of alite and lime in the system (FIG. 27b) without accelerator, the modified system with accelerator demonstrates higher reduction rates in alite and lime (FIG. 27d). Moreover, the incorporation of the accelerator to the washout resistance enhanced SCDA system negates the initial delayed hydration caused by the adsorption of VEA polymer molecules to SCDA particles. Furthermore, unlike in the SCDA consisting only the accelerator, a significant reduction of hydration rate of free lime can be seen in SCDA system with both VEA and accelerator due to the binding of free water to VEA molecules. For instance, at 10 hrs of hydration, the lime content in the SCDA system with accelerator reduced to 9.5% (FIG. 27c), whereas in the SCDA with both VEA and accelerator, lime content of around 15% remained at 10 hrs of hydration (FIG. 27d) allowing a more controlled volume expansion due to the lower free lime reaction rates. This delay also allows gradual hydration of alite in the system (as indicated by the reducing alite content in FIG. 27d) concurrently with the induced volume expansion.

Figure 28:
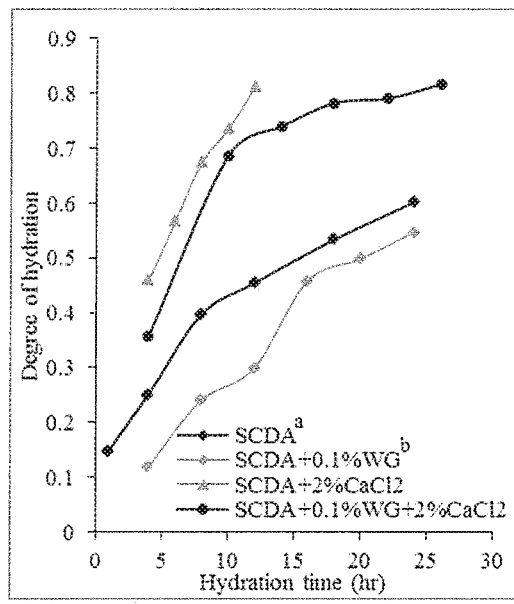
FIG. 28 shows the relationship between the expansive pressure and the degree of hydration of SCDA.

The degree of hydration of different SCDA systems with increasing time of hydration were computed as a fraction of total $Ca(OH)_2$ content at the end of hydration as described by Harada et al. (1993); and Giergiczny (2004). FIG. 28 shows the influence of the additives used to enhance the performance of the reaction rate of SCDA. According to FIG. 28, the degree of hydration of SCDA mixed with 2% of the accelerator reaches around 0.7 within 10 hrs as opposed to the gradual hydration observed in unmodified SCDA, where a hydration of 0.6 was achieved at the end of 24 hrs. Furthermore, a considerable change occurs in the hydration rate when the accelerator is combined with VEA in SCDA. As 16 hrs was taken to increase the degree of hydration from 0.69 to 0.82. Comparatively, the system which only has the accelerator, only 3 hrs was taken to increase the degree of hydration from 0.7 to 0.8, observed in the modified SCDA system.

This phenomenon of gradual hydration may be the reason for observed greater expansive pressure development in the system comprising both VEA and the accelerator compared to system without VEA.

Figure 29:
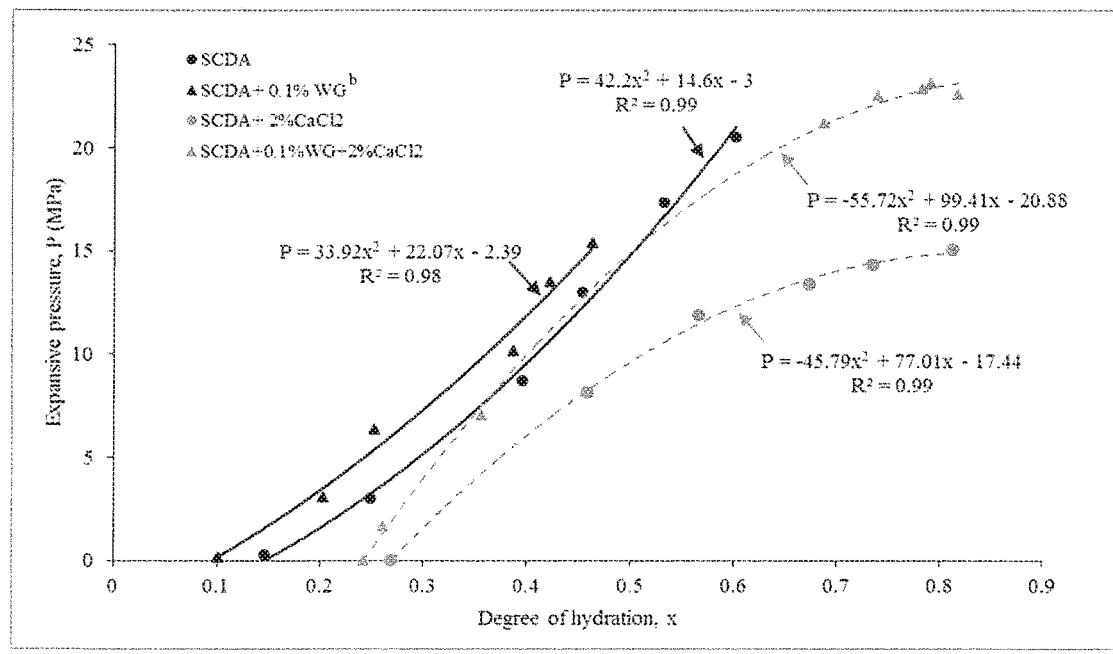
FIG. 29 shows the influence of additives on the degree of hydration of SCDA.

In order to establish the relationship between the expansive pressure and the degree of hydration of SCDA, the expansive pressure was replotted against the degree of hydration under each mixing condition and the results are shown in FIG. 29. The degree of hydration required for the onset of expansive pressure in SCDA decreases due to the increased viscosity in the pore fluid of expansive cement, which is also confirmed to be true when the reaction is accelerated by the addition of the chemical accelerator as shown in FIG. 29. According to the results, the addition of the accelerator into SCDA systems appears to demonstrate an entirely different relationship between the degree of hydration and the expansive pressure compared to one without the accelerator. This is clearly evident by Eq. [4] and [5] below, where the expansive pressure development was correlated with the degree of hydration of unmodified SCDA and SCDA mixed with 0.1% VEA, respectively.

$$P=42.2x2+14.6x-3 \quad [4]$$

$$P=33.92x2+22.07x-2.39 \quad [5]$$

where P is the expansive pressure measured and x is the degree of hydration.

In order to understand the influence of accelerator on SCDA hydration process, the variations of expansive pressure with degree of hydration observed above were also modified by introducing accelerator in to the two systems. The obtained relationships can be expressed as Eqs. [6] and [7], respectively. These two equations clearly show that the addition of the accelerator to the system increase the early reaction rate of SCDA, while reducing the expansive pressure increment with increasing degree of hydration towards the end of the hydration process.

$$P=-45.79x2+77.01x-17.44 \quad [6]$$

$$P=-55.72x2+99.41x-20.88 \quad [7]$$

This behaviour, more prominent in the system without VEA, may potentially be due to the reduced alite hydration compared to the free lime hydration in accelerated systems (FIG. 29). The potential changes in the microstructure with the addition of the accelerator can also significantly affect the behaviour of SCDA. Therefore, a microstructural analysis on hydrated SCDA was carried out to better understand the influence of the accelerator on the hydration process.

The Possible Microstructural Modifications Induced Due to the Chemical Accelerator The SEM images of hydrated SCDA with different additives are shown in FIGS. 30(a-d). According to these figures, significant microstructural alterations occur due to the introduction of the accelerator to the system. As discussed above, the better understanding of the mechanism of expansive pressure development of SCDA with accelerator requires a comprehensive evaluation of the initial nucleation process of the outer CSH shell, which forms around hydrating SCDA particles. CSH nucleated by the initial hydration of alite acts as a barrier for further hydration in the SCDA system (Juenger et al., 2005). This prevents subsequent hydration of free lime, which is responsible for the volumetric expansion.

The acceleration is known to be caused by two effects. Firstly, early hydration of alite allows the saturation of the liquid phase from $Ca^{2+}$ ions detached from alite. In the presence of $CaCl_2$, additional $Ca^{2+}$ ions are also adsorbed to the surface of hydrated SCDA particles causing an increased zeta potential of the hydrated layer compared to the state in the absence of $CaCl_2$ (Singh and Ojha, 1981). This positive zeta potential in the surface of cement particles facilitates the accelerated hydration of alite and forms a layer of CSH gel preventing further hydration of the cementing compounds. However, random ruptures result due to the diffusion of $OH^-$ ions through the CSH layers allowing further hydration of unreacted material. In the presence of $CaCl_2$, the hydration acceleration is caused by the higher tendency of $Cl^-$ to diffuse into the CSH layer than $OH^-$, which facilitates early rupturing of the adsorbed ion layer (Ramachandran, 1971, Singh and Ojha, 1981, Diamond and Lopez-Flores, 1981).

The accelerator also has an ability to flocculate hydrophilic colloids such as CSH due to the adsorption of its anions (Double et al., 1983, Wilding et al., 1984, Juenger et al., 2005, Peterson and Juenger, 2006, Thomas et al., 2009). Microscopic observations of early stage cement hydration with chemical accelerators have shown honeycomb-like morphologies with cross-linked networks between clusters of hydrated products (SUEUR, 1984, Juenger et al., 2005, Riding et al., 2010). This creates voids in the CSH gel diffusion barrier providing access of water molecules to unhydrated alite particles in the system which accelerates the hydration process. Consequently, this reaction produces smaller clusters of hydrated product allowing more free water to permeate into unhydrated SCDA particles.

Figures 30A, 30B:
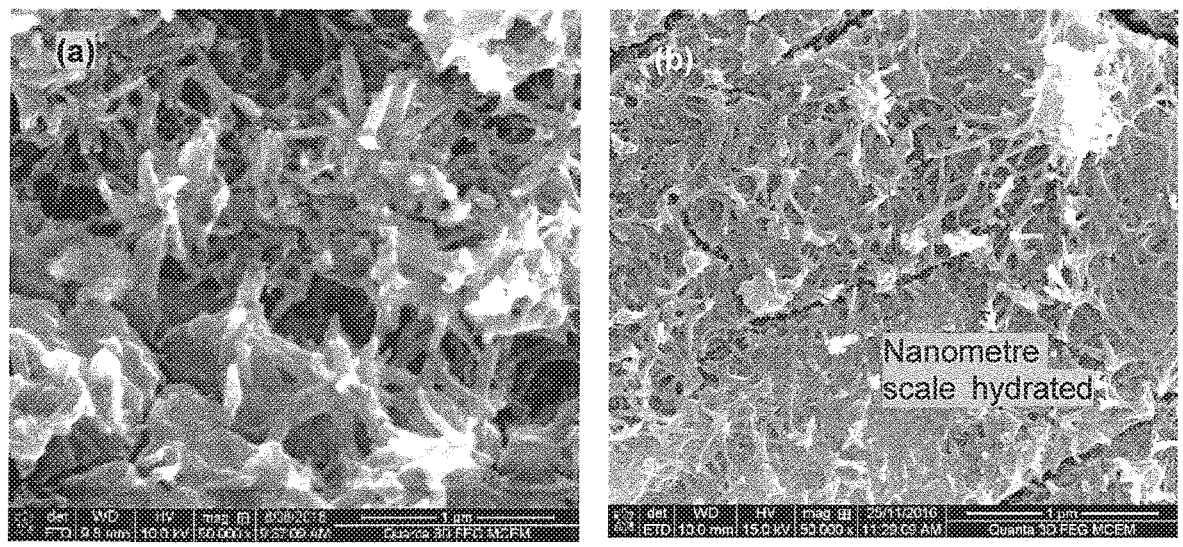
FIGS. 30a to 30d show SEM images of hydrating SCDA (a) unmodified SCDA, (b) SCDA+2% $CaCl_2$, (c) SCDA+ 0.1% VEA, (d) SCDA+0.1% VEA+2% $CaCl_2$.
Figures 30C, 30D:
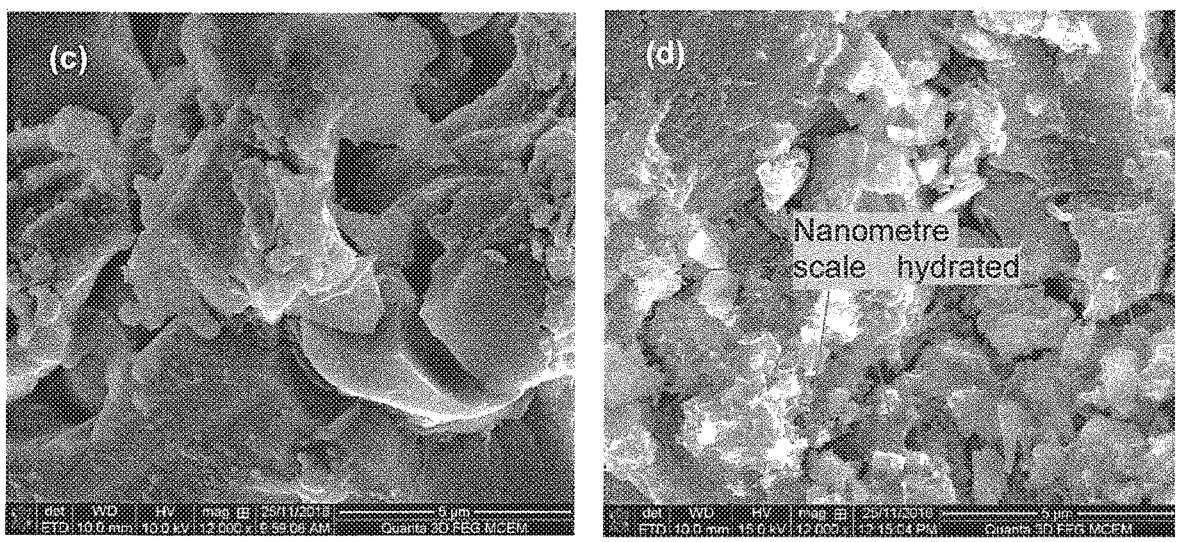

The microstructure of SCDA with the addition of the chemical accelerator showed a similar structure where a network of cross linked clusters. Compared to the developed microstructure of unmodified SCDA (FIG. 30a) a much denser network of smaller clusters of nanometre-scale can be seen in the presence of the accelerator (FIG. 30b). This effect was also prominent in the system containing both VEA and the accelerator as well. As shown in FIG. 30c, SCDA having 0.1% VEA has smooth surfaces with no hydration product indicating a hindered reaction, however, in the same time of hydration the addition of the accelerator by 2% produces clusters of hydrated product on the surface of SCDA particles (FIG. 30d).

Figure 31:
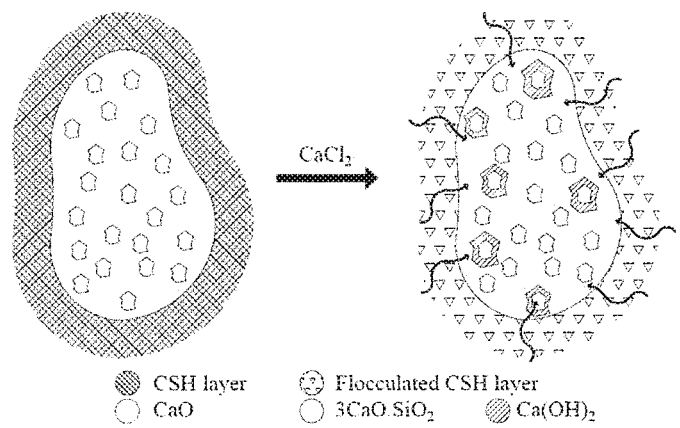
FIG. 31 shows the effects of $CaCl_2$ on the flocculation of CSH layer formed in hydrating SCDA.

A schematic diagram depicting the possible effect of the chemical accelerator on the hydration process of SCDA is shown in FIG. 31. The accelerator in SCDA flocculates the CSH forming clusters. The resultant pore structure in CSH allows the hydration of CaO particles enabling the SCDA to generate expansive pressure at an earlier stage. The flocculation observed in the CSH layer allows easier pathways for water molecules to reach unhydrated CaO particles causing accelerated CaO hydration. The observed trend in the increased hydration of lime compared to the hydration of alite with respect to the change in mineralogy (FIGS. 27c,d) can be explained by this phenomenon.

Figure 32:
FIG. 32 shows SCDA in submerged conditions, (top) base SCDA, (bottom) hydrophobic modified SCDA.

With increasing accelerator content this characteristic behaviour of SCDA can be expected to be more prominent, leading to an even greater hydration of free lime although the hydration of alite would be relatively less. It was established that the hydration of alite not only controls the volume expansion of SCDA, but also contributes to the strength of SCDA which is essential for the generation of expansive pressure. Increasing the accelerator content excessively to achieve desired expansive pressures quickly only results in an early lime hydration causing a burst of volume expansion, but the strength in SCDA required to sustain a large expansive pressure will not be reached simultaneously. Consequently, with increasing accelerator dose, an early expansive pressure generation with a lower peak expansive pressure can be observed as shown in FIG. 17. However, when the accelerator is added to SCDA containing VEA, the lime hydration becomes less violent. Although a flocculated CSH structure can still be observed during hydration, due to the binding effect of pore water to VEA molecules the hydration of lime is delayed. This allows for a more controlled hydration of lime to occur parallel with alite hydration resulting in a moderate rate of hydration towards the latter stages (FIG. 28: SCDA+0.1% VEA+2% accelerator, hydration plot). The ultimate result is a higher peak expansive pressure with a marginally lower expansive pressure development rate compared to SCDA containing only $CaCl_2$. Illustrated in FIG. 32 is a comparison of the base SCDA (top image) and the modified SCDA (bottom image) placed in water, clearly indicating superior washout resistance of the modified SCDA in submerged conditions.

Example 3

The fracturing performance of the improved SCDA of the present invention was evaluated under different confining pressures and saturation fluids. The optimum combination of VEA, accelerator component and the HRWR (or superplasticizer) used for the testing is shown in Table 8 below:

TABLE 8

| Component | Percentage by weight of SCDA |
| --- | --- |
| VEA (Welan gum) | 0.1% |
| Accelerator (CaCl2) | 2.0% |
| HRWR (Sodium Naphthalene Formaldehyde Sulfonate) | 2.5% |

Figure 33:
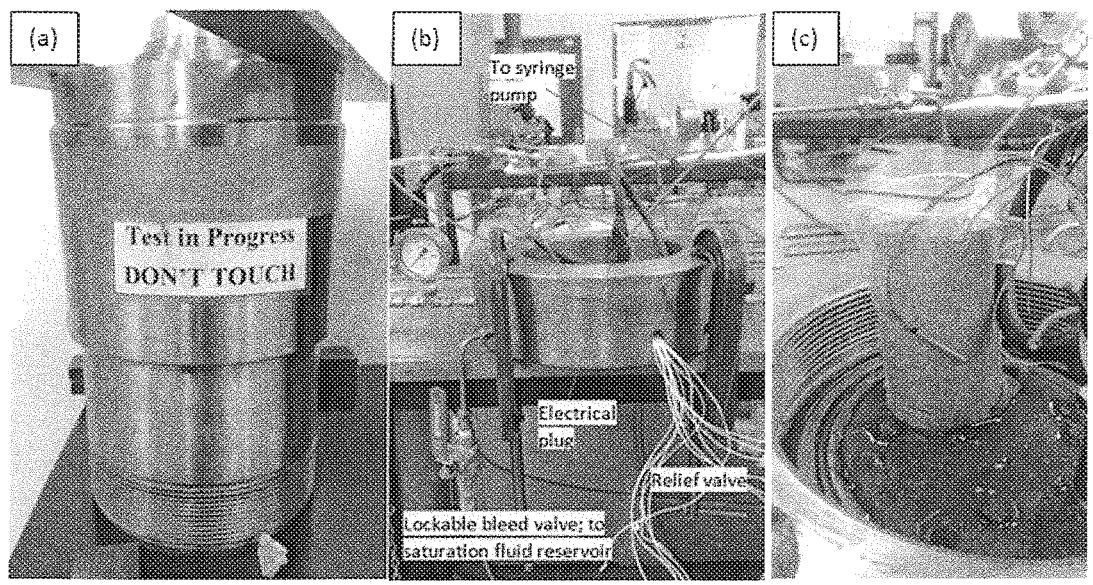
FIG. 33 shows sample preparation and experimental setup for the evaluation of fracturing performance of the improved SCDA of the present invention under different confining pressures and saturation fluids.
Figure 34:
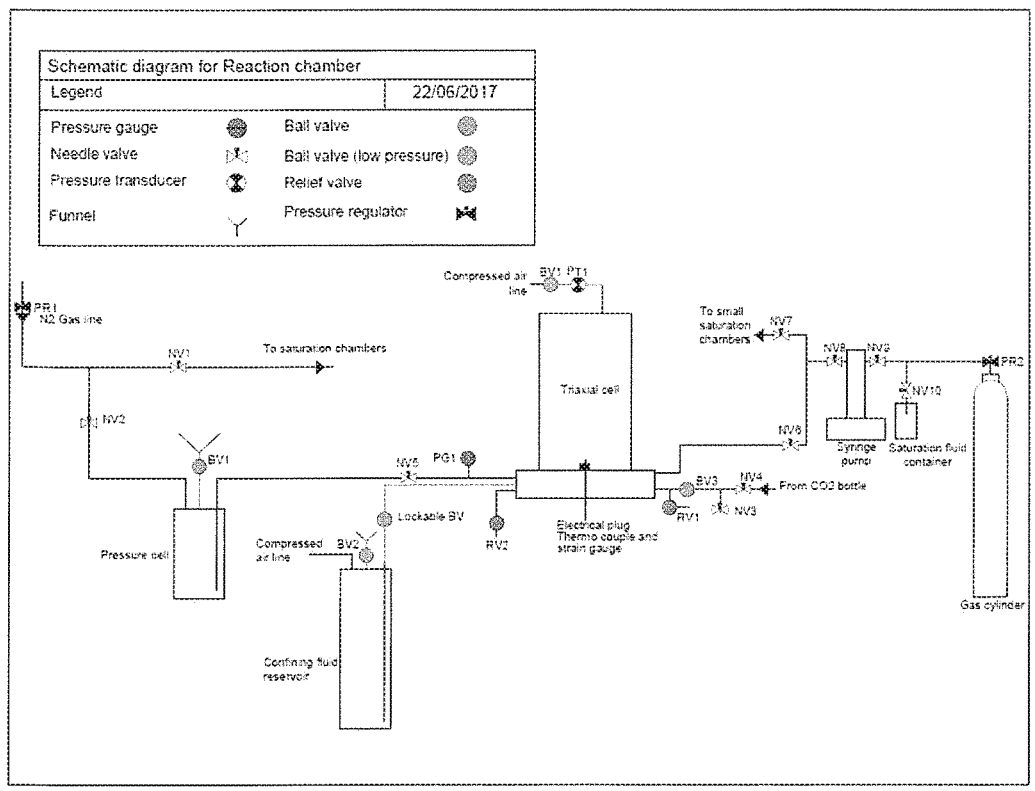
FIG. 34 shows a schematic representation of the experimental setup of FIG. 33.

Laboratory scale fracture tests were carried out for cylindrical sandstone specimens with a 55 mm diameter and a 108 mm height. The SCDA was injected through a 5 mm borehole drilled in the centre of each sample. Once SCDA was injected, the specimens were placed in a pressure cell and filled with different saturation fluids (Water, 20% NaCl brine, Oil). The three saturation fluids were used for sample saturation to replicate water saturated sedimentary rock formations, rock formations in saline aquifers and oil fields in sedimentary rock deposits. The pressure vessel was then pressurised and the specimens were fractured under different confining pressures. Table 9 below shows the ambient conditions for fracture tests. Sample preparation and the experimental setup is shown in FIG. 33. A schematic of the experimental setup is shown in FIG. 34.

TABLE 9

Test conditions for SCDA Fracturing

| Saturation fluid | Confining pressure |
| --- | --- |
| Water | 70 kPa, 1 MPa, 5 MPa, 10 MPa, 15 MPa, 20 MPa |
| 20% NaCl brine | 5 MPa, 10 MPa, 15 MPa, 20 MPa |
| Oil | 10 MPa, 15 MPa |

The SCDA of the present invention was capable of fracturing the specimens in all saturation fluids at the tested confining pressures. Different fracture patterns were observed in the sandstone specimens depending on the type of saturation fluid. Summarised in Table 3 are the experimental results observed.

Figure 35A:
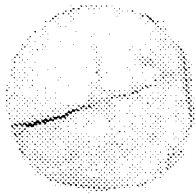
FIGS. 35a and 35b show a first and a second part, respectively, of a table of the performance of modified SCDA under different ambient conditions as investigated in Example 3.
Figure 35A:
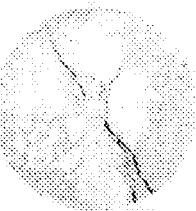
Figure 35A:
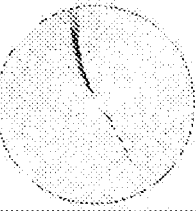
Figure 35A:
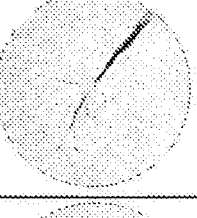
Figure 35A:
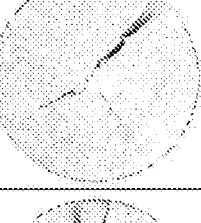
Figure 35A:
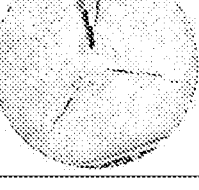
Figure 35B:
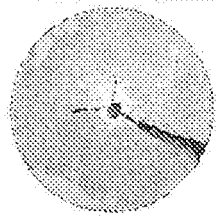
Figure 35B:
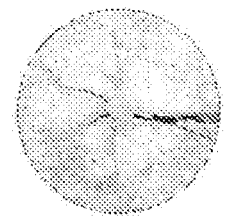
Figure 35B:
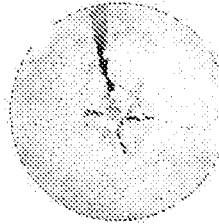
Figure 35B:
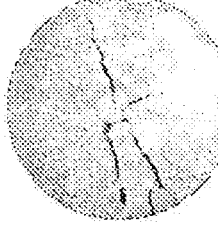
Figure 35B:
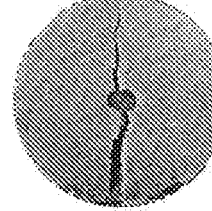
Figure 35B:
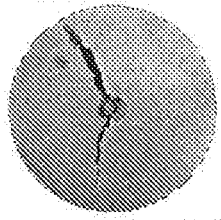

Saline conditions were found to act in favour of the fracturing performance of the SCDA of the present invention as shown in FIGS. 35*a* and 35*b*, where a greater number of primary fractures were generated. This is due to the accelerated reaction rate of the SCDA in saline conditions. Furthermore, an increase in the number of fractures in the sample was observed with increasing confining pressure. This indicates greater fracture performance of the SCDA with increasing depth, with greater confining pressures surrounding the injection hole. Finally, it is apparent that the SCDA of the present invention performed well even in oil saturated conditions. The fracture performance under oil saturation was lower than in brine saturated samples, but comparable with water saturated conditions.

As described above, SCDAs can be used as an alternate in-situ rock fragmentation method. The series of experiments described above as Example 2 were conducted to increase the resistance of SCDAs to mass washout in under water conditions and to increase the rate of hydration. From the experimental results, a modified SCDA which has both high washout resistance and rapid hydration was produced by combining VEA and an anhydrous chemical accelerator. Based on the experimental observations the authors arrive at following conclusions.

Addition of the anhydrous chemical additive accelerates the hydration of SCDA. However, increased dose of the accelerator does not necessarily result in higher expansive pressures at 24 hrs of hydration. This was found to be caused by a rapid reaction of free lime (volume expansion component) compared to the reaction of alite (strength developing component) in the system which prevents the development of necessary strength in SCDA to produce an expansive pressure with volume expansion.

The combination of the accelerator and VEA added to SCDA in amounts of 2% and 0.1% by weight of SCDA respectively is capable of producing an SCDA with an improved expansive pressure generation rate of over 44% and the onset of expansive pressure was improved by 52% compared to unmodified SCDA.

Washout resistance of SCDA is also further increased with the addition of the accelerator to SCDA containing VEA. Washout mass loss of 35.67% was observed in unmodified SCDA while the washout loss of the modified system was only 7.49% having an improvement of 79%.

The flowability of the modified system reduced by 11.76% caused by the rapid consumption of free water in the system from the chemically accelerated hydration which otherwise improves flowability of the system.

SEM imaging of hydrating SCDA revealed an interconnected network of nanometre-scale hydration products indicating a flocculation of the initial hydration product caused by the chemical accelerator in the system. The 'honeycomb-like' structure having more voids facilitates greater accessibility of free water molecules to unhydrated lime, which was identified as the cause for rapid hydration observed.

The approach of combining a chemical accelerator and VEA is an effective means to increase the washout resistance and the rate of expansive pressure development of SCDA and the inventors have successfully produced an SCDA system capable of quick generation of expansive pressure in underwater conditions which is unprecedented. However, the peak expansive pressure generated at the end of 24 hrs is limited by the composition of SCDA used in this study. It is envisaged that the methodology described hereinabove can be readily adopted to enhance the performance of calcium silicate based SCDA systems for field applications.

As noted previously, the dilution effect for SCDAs has previously been shown to be minimised through the addition of a viscosity enhancing agent (eg. welan gum). Yet, when welan gum is added to SCDA it significantly decreases the reaction rate SCDA which leads to prolonged fracture initiation times in SCDA.

Anhydrous calcium chloride ($CaCl_2$) has been added to the mixture as this speeds up the fracture initiation times. Yet the combination of welan gum and $CaCl_2$, where high concentrations of $CaCl_2$ are used, results in a lower peak expansion pressure. This highlights the fact that the right balance between these competing priorities must be made if the aims of the present invention are to be achieved.

In addition, a high range water reducing admixture (HRWR), for example a sodium salt of naphthalene formaldehyde sulfonic acid, was also incorporated to retain the fluidity of SCDA once mixed with water. Fluidity of the mixture is important as when used far underground and underwater pumping of the mixture is required.

The experimental work described hereinabove demonstrates that an optimum combination of water (30%), welan gum (0.1%), HRWR (2.5%) and $CaCl_2$ (2%) by weight of SCDA produces an SCDA system capable of rapidly producing expansive pressure under submerged conditions, such as underwater or in submerged rock settings, and which can be applied in the mining industry.

By generating a localised complex fracture network within a saturated rock environment, a leach out process can be used to remove the mineral elements from the mine in-situ. This removes the extremely energy intensive steps of excavation, transportation and crushing the rock for mineral extraction.

It is understood that the improved SCDA of the present invention can provide the fast generation of expansive pressure, a complex fracture network, which allows for leaching processes to proceed relatively quickly, and provides the ability for use underwater and in deep saturated rock environments. The improved SCDA of the present invention also provides improved performance in all saturation fluids at all tested confining pressures.

Modifications and variations such as would be apparent to the skilled addressee are considered to fall within the scope of the present invention.

REFERENCES

ALLEN, A. J., THOMAS, J. J. & JENNINGS, H. M. 2007. Composition and density of nanoscale calcium-silicate-hydrate in cement. Nature materials, 6, 311-316.

ALLEN, F. L., BEST, G. H. & LINDROTH, T. A. 1991. Welan gum in cement compositions. Google Patents.

ARSHADNEJAD, S., GOSHTASBI, K. & AGHAZADEH, J. 2011. A model to determine hole spacing in the rock fracture process by non-explosive expansion material. International Journal of Minerals, Metallurgy, and Materials, 18, 509-514.

BOUVET, A., GHORBEL, E. & BENNACER, R. 2010. The mini-conical slump flow test: Analysis and numerical study. Cement and concrete research, 40, 1517-1523.

BROWN, P. W., HARNER, C. L. & PROSEN, E. J. 1986. The effect of inorganic salts on tricalcium silicate hydration. Cement and Concrete Research, 16, 17-22.

BULLARD, J. W. & FLATT, R. J. 2010. New Insights Into the Effect of Calcium Hydroxide Precipitation on the Kinetics of Tricalcium Silicate Hydration. Journal of the American Ceramic Society, 93, 1894-1903.

CHATTERJI, S. 1995. Mechanism of expansion of concrete due to the presence of dead-burnt CaO and MgO. Cement and Concrete Research, 25, 51-56.

CHEESEMAN, C. R. & ASAVAPISIT, S. 1999. Effect of calcium chloride on the hydration and leaching of lead-retarded cement. Cement and Concrete Research, 29, 885-892.

DE SILVA, R., PATHEGAMA GAMAGE, R. & ANNE PERERA, M. 2016. An Alternative to Conventional Rock Fragmentation Methods Using SCDA: A Review. Energies, 9, 958.

DEXPAN. 2016. Archer USA [Online]. Available: http://www.dexpan.com/dexpan-non-explosive-controlled-demolition-agent-silent-cracking-breaking.aspx [Accessed Oct. 5, 2016.

DIAMOND, S. & LOPEZ-FLORES, F. 1981. Fate of Calcium Chloride Dissolved in Concrete Mix Water. Journal of the American Ceramic Society, 64, C-162-C-164.

DOUBLE, D., HEWLETT, P., SING, K. & RAFFLE, J. 1983. New developments in understanding the chemistry of cement hydration [and discussion]. Philosophical Transactions of the Royal Society of London A: Mathematical, Physical and Engineering Sciences, 310, 53-66.

EIA. 2016. International energy outlook 2016-Coal [Online]. ENERGY INFORMATION ADMINISTRATION. Available: https://www.eia.gov/forecasts/ieo/coal.cfm [Accessed 21 Nov. 2016 2016].

ELAKNESWARAN, Y., NAWA, T. & KURUMISAWA, K. 2009. Electrokinetic potential of hydrated cement in relation to adsorption of chlorides. Cement and Concrete Research, 39, 340-344.

EL DESSOUKI, A. & MITRI, H. 2011. Rock breakage using expansive cement. Engineering, 3, 168

FIALHO, A. M., MOREIRA, L. M., GRANJA, A. T., POPESCU, A. O., HOFFMANN, K. & SÁ-CORREIA, I. 2008. Occurrence, production, and applications of gellan: current state and perspectives. Applied microbiology and biotechnology, 79, 889-900.

FORMOSA, L., MALLIA, B. & CAMILLERI, J. 2013. A quantitative method for determining the antiwashout characteristics of cement☐based dental materials including mineral trioxide aggregate. International endodontic journal, 46, 179-186.

FRANKS, D. M., BOGER, D. V., CÔTE, C. M. & MULLIGAN, D. R. 2011. Sustainable development principles for the disposal of mining and mineral processing wastes. Resources Policy, 36, 114-122.

GALLUCCI, E., MATHUR, P. & SCRIVENER, K. 2010. Microstructural development of early age hydration shells around cement grains. Cement and Concrete Research, 40, 4-13.

GARTNER, E. M. & JENNINGS, H. M. 1987. Thermodynamics of Calcium Silicate Hydrates and Their Solutions. Journal of the American Ceramic Society, 70, 743-749.

GIERGICZNY, Z. 2004. Effect of some additives on the reactions in fly ash-Ca (OH) 2 system. Journal of Thermal analysis and calorimetry, 76, 747-754.

HANSEN, J., SATO, M., RUEDY, R., LO, K., LEA, D. W. & MEDINA-ELIZADE, M. 2006. Global temperature change. Proceedings of the National Academy of Sciences, 103, 14288-14293.

HARADA, T., SOEDA, K., IDEMITSU, T. & WATANABE, A. Characteristics of expansive pressure of an expansive demolition agent and the development of new pressure transducers. PROCEEDINGS-JAPAN SOCIETY OF CIVIL ENGINEERS, 1993. DOTOKU GAKKAI, 91-91.

HENIEGAL, A. M. 2012. Behavior of underwater self-compacting concrete. J. Eng. Sci, 40, 1005-1023. HEIKAL, M. 2004. Effect of calcium formate as an accelerator on the physicochemical and mechanical properties of pozzolanic cement pastes. Cement and Concrete Research, 34, 1051-1056.

HINZE, J. & BROWN, J. 1994. Properties of soundless chemical demolition agents. Journal of construction engineering and management, 120, 816-827.

HIROTA, T. & ISHIZAKI, Y. 1986. Static expansive demolition agent in the three-dimensional form and process for demolishing brittle material using the same. Google Patents.

HUANG, H., LIU, Y. & LIU, R. 2009. [*Sphingomonas* sp.: an important microbial resource for biopolymer synthesis]. Wei sheng wu xue bao=Acta microbiologica Sinica, 49, 560-566.

ISH-SHALOM, M. & BENTUR, A. 1974. Properties of type K expansive cement of pure components I. Hydration of unrestrained paste of expansive component—Results. Cement and concrete research, 4, 519-532.

ISHII, S., KUBOTA, H., HIDA, T. & MIGITA, J. 1989. Expansive demolition agent. Google Patents.

ISH-SHALOM, M. & BENTUR, A. 1975. Properties of type K expansive cement of pure components III. Hydration of pure expansive component under varying restraining conditions. Cement and Concrete Research, 5, 139-152.

JUENGER, M., MONTEIRO, P., GARTNER, E. & DENBEAUX, G. 2005. A soft X-ray microscope investigation into the effects of calcium chloride on tricalcium silicate hydration. Cement and Concrete Research, 35, 19-25.

KAI, D., LI, D., ZHU, X., ZHANG, L., FAN, H. & ZHANG, X. 2009. Addition of sodium hyaluronate and the effect on performance of the injectable calcium phosphate cement. Journal of Materials Science: Materials in Medicine, 20, 1595-1602.

KANG, K. S. & VEEDER, G. T. 1982. Heteropolysaccharide S-130. Google Patents.

KANTRO, D. L. 1975. Tricalcium silicate hydration in the presence of various salts. Journal of Testing and Evaluation, 3, 312-321.

KANTRO, D. L. 1980. Influence of water-reducing admixtures on properties of cement paste—a miniature slump test. Cement, Concrete and aggregates, 2, 95-102.

KAUR, V., BERA, M. B., PANESAR, P. S., KUMAR, H. & KENNEDY, J. 2014. Welan gum: microbial production, characterization, and applications. International journal of biological macromolecules, 65, 454-461.

KAWANO, T. & ISHII, S. 1982. Demolition agent for brittle materials. Google Patents.

KHAYAT, K. & SARIC-CORIC, M. Evaluation of the effect of Welan Gum-superplasticizer interaction on characteristics and of cement grouts. Proceedings, 6th CANMET/ACI international conference on superplasticizers and other chemical admixtures in concrete, ACI SP, 2000. 249-268.

KHAYAT, K. & YAHIA, A. 1997. Effect of welan gum-high-range water reducer combinations on rheology of cement grout. ACI Materials Journal, 94, 365-372.

KHAYAT, K. H. 1995. Effects of antiwashout admixtures on fresh concrete properties. Materials Journal, 92, 164-171.

KHAYAT, K. H. 1998. Viscosity-enhancing admixtures for cement-based materials—an overview. Cement and Concrete Composites, 20, 171-188.

KOBAYASHI, W., OTAKA, S. & NAGAI, M. 1990. Statical demolition-facilitating agent. Google Patents.

KUZEL, H. J. & PÖLLMANN, H. 1991. Hydration of C3A in the presence of Ca(OH)2, CaSO4.2H2O and CaCO3. Cement and Concrete Research, 21, 885-895.

KWAN, A. & WONG, H. 2008. Effects of packing density, excess water and solid surface area on flowability of cement paste. Advances in Cement Research.

LAEFER, D. F., CERIBASI, S., WORTMAN, J., ABROZEVITCH-COOPER, N., HUYNH, M.-P. & MIDGETTE, J. 2010. Expansive fracture agent behaviour for concrete cracking.

LAVRENTOVICH, O. D., LAZO, I. & PISHNYAK, O. P. 2010. Nonlinear electrophoresis of dielectric and metal spheres in a nematic liquid crystal. Nature, 467, 947-950.

MA, L., ZHAO, Q., YAO, C. & ZHOU, M. 2012. Impact of welan gum on tricalcium aluminate-gypsum hydration. Materials Characterization, 64, 88-95.

MAILVAGANAM, N. P. & RIXOM, M. 2002. Chemical admixtures for concrete, CRC Press.

MAKINO, Y., KAKINUMA, T., IWATA, T., ITOH, M. & HIROSE, T. 1988. Demolition agent for brittle materials. Google Patents.

MUDD, G. M. 2010. The Environmental sustainability of mining in Australia: key mega-trends and looming constraints. Resources Policy, 35, 98-115.

NAKAJIMA, K., IKEHARA, T. & NISHI, T. 1996. Observation of gellan gum by scanning tunneling microscopy. Carbohydrate Polymers, 30, 77-81.

NATANZI, A. S., LAEFER, D. F. & CONNOLLY, L. 2016. Cold and moderate ambient temperatures effects on expansive pressure development in soundless chemical demolition agents. Construction and Building Materials, 110, 117-127.

NODA, S., FUNAMI, T., NAKAUMA, M., ASAI, I., TAKAHASHI, R., AL-ASSAF, S., IKEDA, S., NISHINARI, K. & PHILLIPS, G. O. 2008. Molecular structures of gellan gum imaged with atomic force microscopy in relation to the rheological behavior in aqueous systems. 1. Gellan gum with various acyl contents in the presence and absence of potassium. Food Hydrocolloids, 22, 1148-1159.

NORGATE, T. & JAHANSHAHI, S. 2010. Low grade ores—Smelt, leach or concentrate—Minerals Engineering, 23, 65-73.

OGAWA, E., MATSUZAWA, H. & IWAHASHI, M. 2002. Conformational transition of gellan gum of sodium, lithium, and potassium types in aqueous solutions. Food Hydrocolloids, 16, 1-9.

PETERSON, V. K. & JUENGER, M. C. G. 2006. Hydration of tricalcium silicate: effects of CaCl2 and sucrose on reaction kinetics and product formation. Chemistry of materials, 18, 5798-5804.

PLANK, J., LUMMER, N. R. & DUGONJIĆ-BILIĆ, F. 2010. Competitive adsorption between an AMPS®-based fluid loss polymer and Welan gum biopolymer in oil well cement. Journal of Applied Polymer Science, 116, 2913-2919.

POINTEAU, I., REILLER, P., MACÉ, N., LANDESMAN, C. & COREAU, N. 2006. Measurement and modeling of the surface potential evolution of hydrated cement pastes as a function of degradation. Journal of Colloid and Interface Science, 300, 33-44.

POLLOCK, T. J. 1993. Gellan-related polysaccharides and the genus *Sphingomonas*. Microbiology, 139, 1939-1945.

PORTER, M. L., BERTÓ, A., PRIMUS, C. M. & WATANABE, I. 2010. Physical and chemical properties of new-generation endodontic materials. Journal of endodontics, 36, 524-528.

QIU, X., ZENG, W., YU, W., XUE, Y., PANG, Y., LI, X. & LI, Y. 2015. Alkyl chain cross-linked sulfobutylated lignosulfonate: a highly efficient dispersant for carbendazim suspension concentrate. ACS Sustainable Chemistry & Engineering, 3, 1551-1557.

RAMACHANDRAN, V. S. 1971. Possible states of chloride in the hydration of tricalcium silicate in the presence of calcium chloride. Matériaux et Construction, 4, 3-12.

RIDING, K., SILVA, D. A. & SCRIVENER, K. 2010. Early age strength enhancement of blended cement systems by CaCl2 and diethanol-isopropanolamine. Cement and Concrete Research, 40, 935-946.

SAKATA, N., YANAI, S., YOKOZEKI, K. & MARUYAMA, K. 2003. Study on new viscosity agent for combination use type of self-compacting concrete. Journal of Advanced Concrete Technology, 1, 37-41.

SINGH, N. & OJHA, P. 1981. Effect of CaCl2 on the hydration of tricalcium silicate. Journal of Materials Science, 16, 2675-2681.

SOEDA, K. & HARADA, T. 1993. The Mechanics of Expansive Pressure Generation Using Expansive Demolition Agent. Doboku Gakkai Ronbunshu, 1993, 89-96.

STEIN, H. N. 1972. Thermodynamic considerations on the hydration mechanisms of Ca3SiO5 and Ca3Al2O6. Cement and Concrete Research, 2, 167-177.

STEIN, H. N. & STEVELS, J. M. 1964. Influence of silica on the hydration of 3 CaO, SiO2. Journal of Applied Chemistry, 14, 338-346.

SUEUR, L. Chemical and morphological studies of the hydration of tricalcium silicate. Proc. Br. Ceram. Soc., 1984. 177.

THOMAS, J. J., ALLEN, A. J. & JENNINGS, H. M. 2009. Hydration kinetics and microstructure development of normal and CaCl2-accelerated tricalcium silicate pastes. The Journal of Physical Chemistry C, 113, 19836-19844.

TREGGER, N., FERRARA, L. & SHAH, S. P. 2008. Identifying viscosity of cement paste from mini-slump-flow test. ACI Materials Journal, 105, 558-566.

VALENTINI, L. 2013. RieCalc: quantitative phase analysis of hydrating cement pastes. Journal of Applied Crystallography, 46, 1899-1902.

VALENTINI, L., DALCONI, M. C., FAVERO, M., ARTIOLI, G. & FERRARI, G. 2015. In-Situ XRD Measurement and Quantitative Analysis of Hydrating Cement: Implications for Sulfate Incorporation in C—S—H. Journal of the American Ceramic Society, 98, 1259-1264.

VIALLIS-TERRISSE, H., NONAT, A. & PETIT, J.-C. 2001. Zeta-Potential Study of Calcium Silicate Hydrates Interacting with Alkaline Cations. Journal of Colloid and Interface Science, 244, 58-65.

WANG, X., CHEN, L., XIANG, H. & YE, J. 2007. Influence of antiwashout agents on the rheological properties and injectability of a calcium phosphate cement. Journal of Biomedical Materials Research Part B: Applied Biomaterials, 81, 410-418.

WANNIARACHCHI, W., RANJITH, P., PERERA, M., LASHIN, A., AL ARIFI, N. & LI, J. 2015. Current opinions on foam-based hydro-fracturing in deep geological reservoirs. Geomechanics and Geophysics for Geo-Energy and Geo-Resources, 1, 121-134.

WILDING, C., WALTER, A. & DOUBLE, D. 1984. A classification of inorganic and organic admixtures by conduction calorimetry. Cement and Concrete Research, 14, 185-194.

XU, L., XU, G., LIU, T., CHEN, Y. & GONG, H. 2013. The comparison of rheological properties of aqueous welan gum and xanthan gum solutions. Carbohydrate polymers, 92, 516-522.

ZINGG, A., WINNEFELD, F., HOLZER, L., PAKUSCH, J., BECKER, S. & GAUCKLER, L. 2008. Adsorption of polyelectrolytes and its influence on the rheology, zeta potential, and microstructure of various cement and hydrate phases. Journal of Colloid and Interface Science, 323, 301-312.

The invention claimed is:

1. A soundless cracking demolition agent (SCDA) capable of fracturing rocks under submerged conditions, the SCDA comprising 81% to 96% quicklime, about 30% water, about 0.1% of a viscosity enhancing agent (VEA) consisting of an anionic high molecular weight exopolysaccharide comprising welan gum, about 2.5% of a high range water reducing admixture (HRWR) and about 2% of an anhydrous accelerator component comprising $CaCl_2$, by weight of SCDA, whereby the SCDA undergoes an expansion in volume sufficient to fracture rocks when mixed with water.

2. The SODA of claim 1, wherein the HRWR is provided in the form of a sodium salt of naphthalene formaldehyde sulfonic acid.

3. A method for the in-situ leaching of minerals, the method comprising the utilisation of a soundless cracking demolition agent according to claim 1 to enhance the leaching efficiency of mineral ore using expansive pressure to produce a localised complex fracture network underwater or within a saturated ore-bearing rock environment.

4. A method for unconventional oil or gas recovery, the method comprising the utilisation of a soundless cracking demolition agent according to claim 1 to provide access to oil or gas using expansive pressure to produce a localised complex fracture network underwater or within a saturated rock environment.

* * * * *